US012787906B2

(12) United States Patent
Natarajan et al.

(10) Patent No.: US 12,787,906 B2
(45) Date of Patent: Nov. 10, 2026

(54) FOLDABLE MULTI-RANK AGRICULTURAL EQUIPMENT

(71) Applicant: Deere & Company, Moline, IL (US)

(72) Inventors: Kamalakannan Natarajan, Pune (IN); Elijah B. Garner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 240 days.

(21) Appl. No.: 18/809,961

(22) Filed: Aug. 20, 2024

(65) Prior Publication Data

US 2025/0295052 A1 Sep. 25, 2025

Related U.S. Application Data

(60) Provisional application No. 63/567,680, filed on Mar. 20, 2024.

(51) Int. Cl.
*A01B 73/06* (2006.01)
*A01B 73/04* (2006.01)

(52) U.S. Cl.
CPC .......... *A01B 73/065* (2013.01); *A01B 73/048* (2013.01)

(58) Field of Classification Search
CPC ....... A01B 73/00; A01B 73/005; A01B 73/06; A01B 73/065; A01B 73/048
USPC ..................................... 172/1, 324, 311, 385
See application file for complete search history.

(56) References Cited

U.S. PATENT DOCUMENTS 1,941,504 A * 1/1934 White .................... A01B 21/08 172/598
5,062,489 A 11/1991 Adee
5,113,956 A 5/1992 Friesen
5,488,996 A 2/1996 Barry et al.
5,647,440 A 7/1997 Barry et al.
6,209,657 B1 4/2001 Friggstad
6,263,978 B1 7/2001 Friiggstad
6,860,335 B2 3/2005 Arnett
(Continued)

FOREIGN PATENT DOCUMENTS

CA 2059925 C 7/2002
WO 2013134457 A1 9/2013
WO 2020220101 A1 11/2020

OTHER PUBLICATIONS

Extended European Search Report and Written Opinion issued in European Patent Application No. 25160973.1 dated Jul. 28, 2025, in 5 pages.

*Primary Examiner* — Christopher J Sebesta
*Assistant Examiner* — Evan A Bregel
(74) *Attorney, Agent, or Firm* — Tucker Ellis LLP

(57) ABSTRACT

An agricultural implement includes a main carrier including a main frame and a draw member slidably coupled with the main frame, a bumper member, a trip member, an attachment member, sequenced wings, and sequenced draft links. Moving the draw member from a folding intermediate position towards an extended position pivots the sequenced wings towards folded positions by the mutual contact between the trip member and the attachment member. Moving the draw member from an opening intermediate position to a retracted position pivots the sequenced wings towards unfolded positions by the mutual contact between the bumper member and the attachment member. Movement between the draw member and the main frame for any other positions of the draw member causes no motion in the sequenced wings.

19 Claims, 12 Drawing Sheets

(56) References Cited

U.S. PATENT DOCUMENTS

| | | | |
|---|---|---|---|
| 7,604,068 | B1 | 10/2009 | Friesen |
| 7,849,933 | B2 | 12/2010 | Marggi |
| 8,127,861 | B2 | 3/2012 | Meek |
| 8,141,653 | B2 | 3/2012 | Ryder et al. |
| 9,801,324 | B2 | 10/2017 | Lykken |
| 10,028,423 | B2 | 7/2018 | Sudbrink et al. |
| 10,660,257 | B2 | 5/2020 | Czapka et al. |
| 10,966,367 | B2 | 4/2021 | Crucianelli |
| 2007/0163791 | A1 | 7/2007 | Meek |
| 2010/0126744 | A1 | 5/2010 | Poole |
| 2012/0256396 | A1 | 10/2012 | Arnold et al. |
| 2015/0150185 | A1 | 6/2015 | Houck |
| 2015/0156956 | A1 | 6/2015 | Sudkbrink et al. |
| 2015/0223387 | A1 | 8/2015 | Lykken |
| 2015/0319912 | A1 | 11/2015 | Stevenson |
| 2016/0135356 | A1 | 5/2016 | Prickel et al. |
| 2018/0279540 | A1 | 10/2018 | Magarity et al. |
| 2019/0124822 | A1 | 5/2019 | Czapka et al. |
| 2019/0313568 | A1 | 10/2019 | Anderson |

* cited by examiner

FOLDABLE MULTI-RANK AGRICULTURAL EQUIPMENT

CROSS-REFERENCE TO RELATED APPLICATIONS

The present application is based on and claims the benefit of U.S. Provisional Patent application Ser. No. 63/567,680, filed Mar. 20, 2024, entitled FOLDABLE MULTI-RANK AGRICULTURAL EQUIPMENT, the contents of which are hereby incorporated by reference herein its entirety.

FIELD OF THE DISCLOSURE

The present disclosure relates to agricultural implements and, more particularly, to foldable multi-rank agricultural equipment such as row crop planters and seeder systems.

BACKGROUND

Conventional agricultural planters include a main frame and row units coupled directly or indirectly to the main frame. Row units for planting seed may include opener disks for working soil to form furrows or rows in the soil to deposit the seed. Similarly, row units for delivering other commodities such as fertilizer may also include opener disks for forming furrows or rows in the soil to deposit the fertilizer.

Some planters can be configured to simultaneously place seeds while also placing fertilizer into the ground. In some settings there may be a need to apply certain fertilizers at an offset distance from seeds so as not to damage the earliest growth stages of the young plants. One of the widely followed agronomical practices for offset fertilizer placements is referred to as the mid-row band technique in which a fertilizer row is placed between two seed rows.

In addition, the yield from certain types of crops that are typically planted in narrowly spaced apart seed rows can sometimes be benefited from these crops being planted together with fertilizer using for example the mid-row band technique. However, the narrowly spaced apart seed rows make it difficult to arrange dedicated fertilizer openers interspersed amongst the tightly packed seed openers. To achieve the desired narrow seed row spacing while also providing for the desirable mid-row band placement of fertilizer, the row units can be split on the implement into multiple ranks that are separated from each other in the fore-aft direction of the implement, whereby a first rank of row units located in the forward direction may carry the fertilizer storage and fertilizer openers and a second rank of row units arranged in the aft direction may carry the seed storage and seed openers. The fertilizer and seed openers are mutually laterally offset relative to the fore-aft direction of the implement and, in this way effect the mid-row band technique.

But while advantageous in many ways, this special arrangement of fertilizer openers and seed openers split into the multiple row unit ranks in the fore-aft directions can result in an agricultural implement that is very challenging to fold and unfold between stowed and opened configurations that is both effective in the field and also efficient and favorable for road transporting or storage.

There is a need therefore for a folding mechanism and method that provides for simple and efficient movement of multi-rank foldable agricultural equipment between an opened, operational, or deployed position, and a closed, transport, storage, or stowed position.

SUMMARY

Foldable multi-rank agricultural equipment is provided that moves simply and efficiently between an expanded, unfolded or opened conformation, and a minimized, folded or closed conformation. In an illustrative embodiment the equipment is a foldable multi-rank agricultural implement. In general, the expanded, unfolded or opened conformation or position of the implement may be considered an operational or deployed orientation of the foldable agricultural implement wherein, in this position or disposition, the implement may be used to distribute commodities such as seeds, fertilizer, or the like in an area such as in a field. Also in general, the minimized, folded or closed conformation or position of the implement may be considered a transport, storage, or stowed orientation of the foldable agricultural implement wherein, in this compact minimized state, the implement may be efficiently moved from place to place or stored in a desired location. For ease of description "folded" will be used to represent the minimized or closed conformation for storage and/or transport of the implement, and "unfolded" will be used to represent the expanded or opened conformation for use of the implement to distribute commodities such as seeds, fertilizer, or the like in an area such as in a field.

In the illustrative embodiment described herein, the foldable multi-rank agricultural implement is provided in the form of a seeder. However, the foldable multi-rank agricultural implement may be provided in many other forms such as tillage implements, spraying implements, etc.

In accordance with an aspect of an example implementation, an agricultural implement is provided comprising a main carrier, a bumper member, a trip member, an attachment member, a first sequenced wing, and a first sequenced draft link. The main carrier includes a main frame and a draw member slidably coupled with the main frame for movement relative to the main frame between an extended position and a retracted position. The draw member has opposite first and second ends, wherein the first end is adapted for selective connection with an associated agricultural tow vehicle. The bumper member is connected with the draw member adjacent to the first end of the draw member, and the trip member is connected with the draw member between the bumper member and the second end of the draw member. The attachment member is slidably connected with the draw member and is slidable relative to the draw member for a portion of the draw member extending between the trip member and the bumper member. The first sequenced wing carries a first set of row units of the first rank of row units and is operatively connected with the draw member. The first sequenced wing is pivotably connected with the main frame at a position such that the first sequenced wing is pivotable relative to the main frame between an unfolded position and a folded position. The first sequenced draft link has a first end pivotably connected with the first sequenced wing and a second end pivotably connected with the attachment member such that, for transitioning the agricultural implement from its opened configuration to its closed configuration, moving the draw member from the retracted position to a folding intermediate position between the retracted position and the extended position causes at the folding intermediate position a mutual contact between the trip member and the attachment member, and moving the draw member from the folding intermediate position towards the extended position pivots the first sequenced wing towards the folded position by the mutual contact between the trip member and the attachment member. In addition, for transitioning the agricultural implement from its closed configuration to its opened closed configuration, moving the draw member from the extended position to an opening intermediate position causes the trip member and the attachment member to mutually separate and causes at the opening intermediate position a mutual contact between the bumper member and the attachment member, and moving the draw member from the opening intermediate position to the retracted position pivots the first sequenced wing towards the unfolded position by the mutual contact between the bumper member and the attachment member.

In any of the embodiments, the first sequenced wing is pivotable relative to the main frame about an axis between the unfolded position extending substantially perpendicular to the main frame, and the folded position extending substantially in parallel with the main frame.

In any of the embodiments, relative movement between the draw member and the main frame from the folding intermediate position fully to the extended position pivots the first sequenced wing fully to the folded position extending substantially in parallel with the main frame, and relative movement between the draw member and the main frame from the opening intermediate position fully to the retracted position pivots the first sequenced wing fully to the unfolded position extending substantially perpendicular to the main frame.

In any of the embodiments, relative movement between the draw member and the main frame from the retracted position to the folding intermediate position causes no motion of the first sequenced wing by the slidable coupling between the draw member and the main frame, and relative movement between the draw member and the main frame from the extended position to the opening intermediate position causes no motion of the first sequenced wing by the slidable coupling between the draw member and the main frame.

In any of the embodiments, a second sequenced wing carries a second set of row units of the first rank of row units and is pivotably connected with the main frame such that the second sequenced wing is pivotably movable relative to the main frame between folded and unfolded positions. A second sequenced draft link has a first end pivotably connected with the second sequenced wing and a second end pivotably connected with the attachment member such that relative movement between the draw member and the main frame from the folding intermediate position towards the extended position causes the second sequenced wing to pivot towards the folded position by the mutual contact between the trip member and the attachment member, and relative movement between the draw member and the main frame from the opening intermediate position to the retracted position causes the second sequenced wing to pivot towards the unfolded position by the mutual contact between the bumper member and the attachment member.

In any of the embodiments, the second sequenced wing is pivotable relative to the main frame about an axis between the unfolded position extending substantially perpendicular to the main frame, and the folded position extending substantially in parallel with the main frame. In any of the embodiments, relative movement between the draw member and the main frame from the folding intermediate position fully to the extended position causes the first and second sequenced wings to pivot fully to their respective folded positions extending substantially in parallel with the main frame, and relative movement between the draw member and the main frame from the opening intermediate position fully to the retracted position causes the first and second sequenced wings to pivot fully to their respective unfolded position extending substantially perpendicular to the main frame.

In any of the embodiments, relative movement between the draw member and the main frame from the retracted position to the folding intermediate position causes no motion of the first or second sequenced wings by the slidable coupling between the draw member and the main frame, and relative movement between the draw member and the main frame from the extended position to the opening intermediate position causes no motion of the first or second sequenced wings by the slidable coupling between the draw member and the main frame.

In any of the embodiments, a first direct wing is pivotably connected with the main frame such that the first direct wing is pivotably movable relative to the main frame between folded and unfolded positions, and a first direct draft link having a first end pivotably connected with the first direct wing and a second end pivotably connected with the draw member such that relative movement between the draw member and the main frame towards the retracted position causes the first direct wing to pivot towards the unfolded position, and relative movement between the draw member and the main frame towards the extended position causes the first direct wing to pivot towards the folded position.

In any of the embodiments, relative movement between the draw member and the main frame from the retracted position to the folding intermediate position causes no motion of the first sequenced wing by the slidable coupling between the draw member and the main frame, and motion of the first direct wing towards its folded position by the first direct wing being connected with the draw member by the first direct draft link. In any of the embodiments, relative movement between the draw member and the main frame from the extended position to the opening intermediate position causes no motion of the first sequenced wing by the slidable coupling between the draw member and the main frame, and motion of the first direct wing towards its unfolded position by the first direct wing being connected with the draw member by the first direct draft link.

In any of the embodiments, a second direct wing is pivotably connected with the main frame such that the second direct wing is pivotably movable relative to the main frame between folded and unfolded positions, and a second direct draft link has a first end pivotably connected with the second direct wing and a second end pivotably connected with the draw member such that relative movement between the draw member and the main frame towards the retracted position causes the second direct wing to pivot towards the unfolded position, and relative movement between the draw member and the main frame towards the extended position causes the second direct wing to pivot towards the folded position.

In accordance with an aspect of an example implementation, an agricultural implement is provided comprising a main carrier, a bumper member, a trip member, an attachment member, sequenced wings, and direct wings. The main carrier comprises a main frame and a draw member having opposite first and second ends and being slidably coupled with the main frame for movement relative to the main frame between extended and retracted positions. The bumper member is connected with the draw member adjacent to the first end of the draw member. The trip member is connected with the draw member between the bumper member and the second end of the draw member. The attachment member is slidably connected with the draw member, the attachment member being slidably movable relative to the draw member for a portion of the draw member extending between the trip member and the bumper member. The sequenced wings are operatively connected with the attachment member by sequenced draft links and being pivotably connected with the main frame at positions such that the sequenced wings are pivotably movable relative to the main frame between respective folded and unfolded positions. The direct wings are operatively connected with the draw member by direct draft links and are pivotably connected with the main frame at positions such that the direct wings are pivotably movable relative to the main frame between respective folded and unfolded positions. In accordance with an embodiment, relative movement between the draw member and the main frame from the retracted position to a folding intermediate position between the retracted position and the extended position causes at the folding intermediate position a mutual contact between the trip member and the attachment member. In accordance with an embodiment, relative movement between the draw member and the main frame from the extended position to an opening intermediate position between the retracted position and the extended position causes at a position between the opening intermediate position and the retracted position the trip member and the attachment member to mutually separate and causes at the opening intermediate position a mutual contact between the bumper member and the attachment member.

In any of the embodiments, the relative movement between the draw member and the main frame from the retracted position to the folding intermediate position causes the direct wings to pivot towards their respective folded positions without pivotable movement of the sequenced wings.

In any of the embodiments, the relative movement between the draw member 106 and the main frame from the extended position to the opening intermediate position causes the direct wings to pivot towards their respective unfolded positions without pivotable movement of the sequenced wings.

In any of the embodiments, the relative movement between the draw member 106 and the main frame from the extended position to the opening intermediate position causes the direct wings to pivot towards their respective unfolded positions without pivotable movement of the sequenced wings.

In any of the embodiments, relative movement between the draw member 106 and the main frame from the retracted position to the folding intermediate position causes the direct wings to pivot towards their respective folded positions without pivotable movement of the sequenced wings.

In accordance with an aspect of an example implementation, a method is provided for operating an agricultural implement including sequenced wings operatively connected with an attachment member of the agricultural implement by sequenced draft links and being pivotably connected with a main frame of the implement at positions such that the sequenced wings are pivotably movable relative to the main frame between respective folded and unfolded positions, and direct wings operatively connected with a draw member of the agricultural implement by direct draft links and being pivotably connected with the main frame at positions such that the direct wings are pivotably movable relative to the main frame between respective folded and unfolded positions. The method comprises pivoting the direct wings towards their respective folded positions without pivotable movement of the sequenced wings by causing relative movement between the draw member and the main frame from a retracted position to a folding intermediate position between the retracted position and an extended position, and pivoting the direct wings pivot towards their respective unfolded positions without pivotable movement of the sequenced wings by causing relative movement between the draw member and the main frame of the implement from the extended position to an opening intermediate position between a retracted position and the extended position.

In any of the embodiments, the method further comprises pivoting both the direct wings and the sequenced wings towards their respective folded positions by causing relative movement between the draw member and the main frame from the folding intermediate position to the extended position.

In any of the embodiments, the method further comprises pivoting both the direct wings and the sequenced wings towards their respective unfolded positions by causing relative movement between the draw member and the main frame from the unfolding intermediate position to the retracted position.

In any of the embodiments, the method further comprises pivoting both the direct wings and the sequenced wings towards their respective unfolded positions by causing relative movement between the draw member and the main frame from the unfolding intermediate position to the retracted position.

In any of the embodiments, the method further comprises pivoting both the direct wings and the sequenced wings towards their respective unfolded positions by causing relative movement between the draw member and the main frame from the folding intermediate position to the extended position.

In accordance with a further aspect of an example implementation, an agricultural implement is provided comprising an elongate main carrier defining a main axis of the agricultural implement, a first sequenced wing, a second sequenced wing, a first direct wing, and a second direct wing. The first sequenced wing comprises a first sub-portion of a first discontinuous tool bar pivotably coupled with the main carrier, wherein the first tool bar comprises a first portion, a second portion, the first sub-portion, and a second sub-portion. The second sequenced wing comprises the second sub-portion of the first tool bar pivotably coupled with the main carrier on a side of the main carrier opposite from the first sequenced wing. The first direct wing comprises a first portion of a second discontinuous tool bar pivotably coupled with the main carrier, wherein the second tool bar comprises the first portion and a second portion. The second direct wing comprises the second portion of the second tool bar pivotably coupled with the main carrier on a side of the main carrier opposite from the first direct wing. In the example implementation, the first and second portions of the second tool bar comprising the first and second direct wings are pivotable relative to the main frame between folded and unfolded positions respectively about axes that extend perpendicularly relative to a longitudinal plane containing the main axis and the main carrier of the agricultural implement. In the example implementation, the first and second sub-portions of the first tool bar comprising the first and second sequenced wings are pivotable relative to the main frame between folded and unfolded positions respectively about axes that extend perpendicularly relative to the longitudinal plane containing the main axis and the main carrier of the agricultural implement. In the example implementation, the first portion of the first tool bar of the first sequenced wing is pivotably coupled with the first portion of the second tool bar, and the second portion of the first tool bar of the second sequenced wing is pivotably coupled with the second portion of the second tool bar. In the example implementation, the first and second portions of the first tool bar are pivotable relative to the second tool bar respectively about axes that extend in parallel with the longitudinal plane of the agricultural implement. In addition in the example implementation, the first and second portions of the first tool bar are pivotable relative to the second tool bar respectively about axes that extend in parallel with the longitudinal plane of the agricultural implement for any position and/or orientation of the first portion of the second tool bar relative to the main carrier and for any position and/or orientation of the second portion of the second tool bar relative to the main carrier.

BRIEF DESCRIPTION OF THE DRAWINGS

In the accompanying drawings which are incorporated in and constitute a part of the specification, embodiments of the disclosure are illustrated, which, together with the general descriptions given above, and the detailed description given below, serve to exemplify the embodiments of this disclosure.

DETAILED DESCRIPTION

In the following description reference is made to the accompanying figures which form a part thereof, and in which is shown, by way of illustration, one or more example embodiments of the disclosed foldable agricultural equipment systems and methods. Various modifications of the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" or "one or more of A, B, and/or C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes. The term "yaw axis," as appearing herein, refers to an axis drawn from top to bottom (vertically) through a vehicle such as for example a tractor or an implement. The yaw axis is perpendicular to the fore-aft and lateral axes. Yaw rotation occurs as the tractor is steered left or right while moving forward or backwards a surface or while an implement is towed left or right while being pulled by the tractor. Yaw rotation also occurs as a self-propelled implement is steered left or right while moving forward or backwards a surface.

Figure 1:
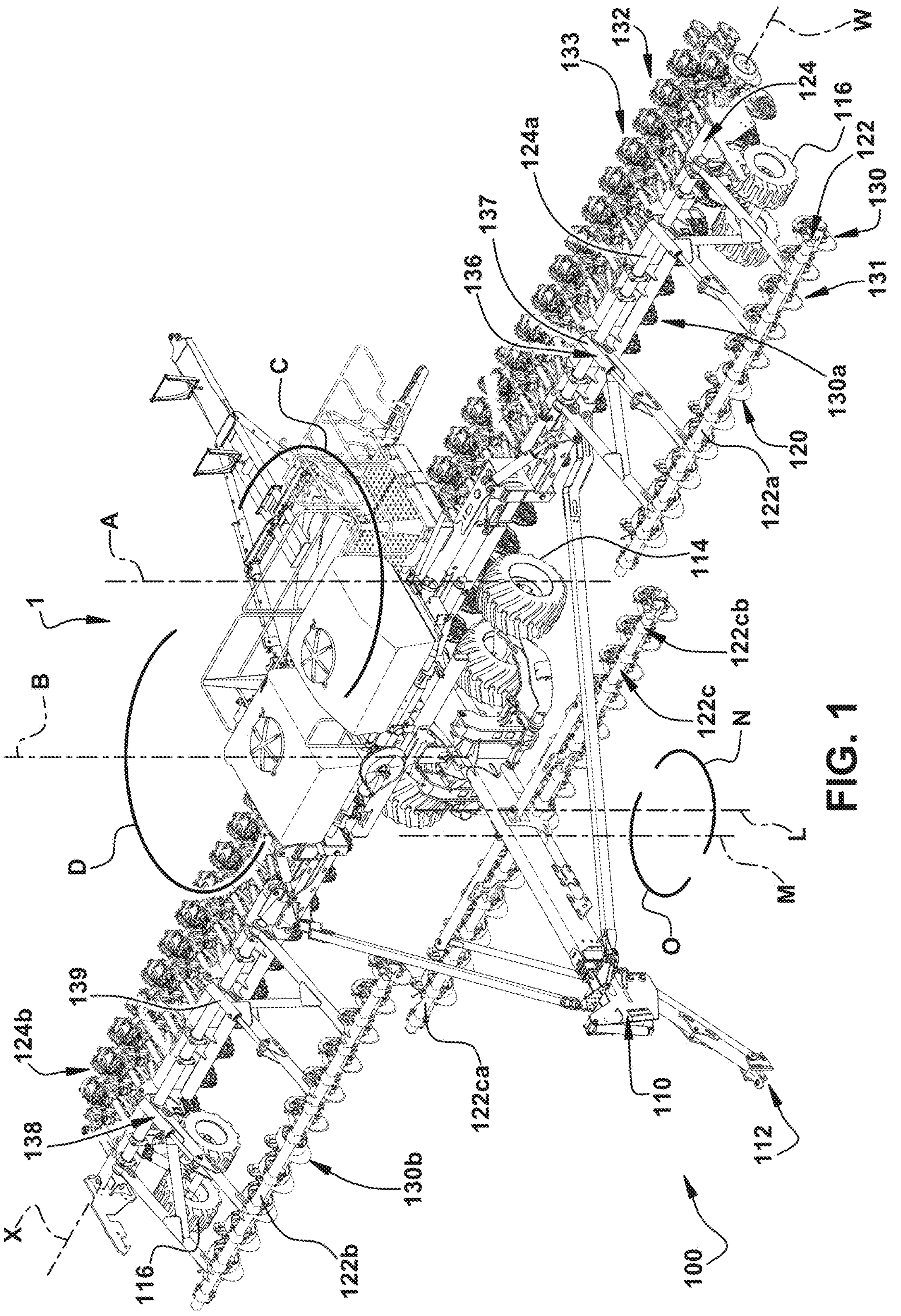
FIG. 1 is a front-side perspective view of a multi-rank agricultural implement disposed in an unfolded and operational or deployed conformation in accordance with an example embodiment.

Referring to FIG. 1 of the present disclosure, foldable equipment is provided in the form of a foldable multi-rank agricultural implement 100. In the example embodiment, the implement 100 is a seeder 10. The implement 100 may have one or more interconnected frame members fixedly coupled to one another to provide a main carrier 102 that includes a main frame 104 and a draw member 106. In the example embodiment the draw member 106 is slidably coupled with the main frame 104 for mutual movement therebetween. In particular, the draw member 106 and the main frame 104 are mutually slidable between a retracted position shown in FIG. 1, and an extended position to be discussed in greater detail below with reference to FIGS. 7D and 8. The main frame 104 and the draw member 106 may be telescopically coupled. For example, the draw member 106 may be telescopically received within the main frame 104. The main carrier 102 defines a main axis F of the implement 100 that, in general and during normal use of the implement, defines the "fore-aft axis" that extends in fore and aft directions of the implement 100 as described above. Further, the draw member 106 of implement 100 may include on a first end 106*a* thereof a tow bar or tongue 110 having a latch 112 that is configured to couple the implement 100 to a work machine such as a tractor or the like.

In the illustrative embodiment, the implement 100 includes one or more ground engaging mechanisms that may be wheels or tracks but are shown in the example embodiment in the form of a first set of wheels 114 coupled to the main carrier 102 and a second set of wheels 116, which are also coupled to the main carrier 102 via intermediary mechanisms to be described in greater detail below. The ground engaging mechanisms and in particular the first and second sets of wheels 114, 116 allow the implement 100 to travel along the ground. Each wheel 114, 116 includes a radial center point 118 about which it rotates. In an example implementation the first set of wheels 114 may be pivotably coupled to the main carrier 102 so that they may be rotated downwardly relative to the main carrier 102 thereby simultaneously elevating the aft end of the full implement 100 and raising the second set of wheels 116 off the ground as shown for example in FIG. 8 for permitting the implement in the folded orientation to be transported such as on a roadway for example. The second set of wheels 116 are positioned laterally outwardly (relative to the main axis F) of the first set of wheels 114 and may be powered using hydraulic or electric motors or the like for assisting in moving the implement 100 between the folded and unfolded configurations. This is advantageous in situations where an associated tractor or the like is unavailable for coupling with the latch 112 of the tow bar or tongue 110 for initiating the mutual movement between the draw member 106 and the main frame 104 between the retracted and extended positions.

While in the illustrative embodiment of FIG. 1 the first and second sets of wheels 114, 116 are configured to follow a work machine as it moves forward, it should be appreciated that in other embodiments the first and/or second sets of wheels 114, 116 may be steerable. For example, the wheel sets 114, 116 may be steered by an operator of the implement 100 or automatically such as for example in an autonomous implement 100. In some embodiments, while each set of wheels may be steerable, the first set of wheels 114 may be actively steerable and the second set of wheels 116 may be passively steerable (i.e., synced to the first set of wheels 114) such that the second set of wheels 116 turns simultaneously with and the same degree of rotation (relative to the main carrier 102) as the first set of wheels 114. In other embodiments, the sets of wheels 114, 116 may be steerable with differing degrees of rotation relative to the main carrier 102. While certain Figures herein show only a first and second sets of wheels, it should be appreciated that this disclosure applies to agricultural machines having additional wheels spaced laterally (relative to the main axis F) across an implement as well.

Referring still to FIG. 1, implement 100 includes a plurality of row units 120 that are indirectly coupled to the main carrier 102 by one or more tool bars. To that point, implement 100 includes a first tool bar 122 and a second tool bar 124. As shown, the first tool bar 122 is positioned forward or fore of the second tool bar 124 and, conversely, the second tool bar 124 is positioned rearward or aft of the fist toll bar 122. In the illustrative embodiment, a first rank 130 of row units 120 is coupled with the first tool bar 122 and a second rank 132 of row units 120 is coupled with the second tool bar 124. The first rank 130 of row units 120 may be fertilizer row units 131 for example coupled with the first or forward tool bar 122 and the second rank 132 of row units 120 may be seeder row units 133 coupled with the second or aft tool bar 124. In the illustrative embodiment, the fertilizer and seeder row units 131, 133 may include also fertilizer and seed openers (not shown) as needed or desired. In addition, the fertilizer and seeder row units 131, 133 may be mutually offset laterally for effecting the mid-row band technique as needed or desired.

With continued reference to FIG. 1 and with additional reference to FIG. 2 and as will be described in greater detail below, the aft or second tool bar 124 includes first and second portions 124*a*, 124*b* carried on opposite sides of the main frame 104 of the main carrier 102. In the example, the first and second portions 124*a*, 124*b* of the second tool bar 124 are pivotably coupled with the main frame 104 and, in particular are pivotable relative to the main carrier 102 and main frame 104 about axes A, B that extend vertically as viewed in the drawing Figure. As such, the first and second portions 124*a*, 124*b* are movable through arcs C, D that lie in general in a horizontal plane, wherein the horizontal plane containing the arcs C, D is substantially parallel with the ground 118 and wherein in general the horizontal plane containing the arcs C, D is substantially co-extensive with the main axis F of the implement 100 and also contains in general the main carrier 102 and main frame 104. In the example illustrated, the axes A and B are mutually parallel, and the arcs C and D are mutually co-planar. It is to be noted that the axes A and B are mutually parallel, and the arcs C and D are mutually co-planar for the implement 100 being disposed in either the folded (FIG. 8) conformation, or the unfolded (FIG. 1) conformation, and also for the implement being disposed in any configuration or orientation between the folded or unfolded conformations.

As also shown best in FIGS. 1, 7A, and 9B and as will be described in greater detail below, the fore or first tool bar 122 includes a first portion 122*a* that is pivotably coupled with the first portion 124*a* of the second tool bar 124, a second portion 122*b* that is pivotably coupled with the second portion 124*b* of the second tool bar 124, and a third portion 122*c* that is pivotably coupled with the main frame 104 of the main carrier 102. As shown best in FIGS. 2, 3, 8, and 10 the first portion 122*a* of the first toll bar 122 is pivotably carried on the first portion 124*a* of the second tool bar 124. Also as shown in those Figures, the second portion 122*b* of the first toll bar 122 is pivotably carried on the second portion 124*b* of the second tool bar 124. In this regard, the first and second portions 122*a*, 122*b* of the first toll bar 122 are pivotable relative to the first and second portions 124*a*, 124*b*, respectively, of the second tool bar 124 about first and second axes W, X, respectively, that extend horizontally as viewed in the drawing Figures and, as such are movable through arcs Y, Z, respectively, that lie in general in vertical planes as viewed in the drawing Figure. In the example illustrated, the axes W and X extend in the horizontal plane and are mutually coaxial when the first and second tool bar portions 124*a*, 124*b* of the second tool bar 124 are in their unfolded positions as shown in FIGS. 1 and 2. Similarly, the arcs Y and Z are mutually co-planar when the first and second tool bar portions 124*a*, 124*b* of the second tool bar 124 are in their unfolded positions as shown in FIGS. 1 and 2. Also in the example illustrated, the axes W and X are generally parallel with axes defined by the first and second tool bar portions 124*a*, 124*b* of the second tool bar 124 for the first and second tool bar portions 124*a*, 124*b* of the second tool bar 124 disposed in either the folded or unfolded orientations as well as in positions intermediate the folded and unfolded orientations. Similarly, the arcs Y and Z are generally perpendicular with the axes defined by the first and second tool bar portions 124*a*, 124*b* of the second tool bar 124 for the first and second tool bar portions 124*a*, 124*b* of the second tool bar 124 disposed in either the folded or unfolded orientations as well as in positions intermediate the folded and unfolded orientations.

Figure 2:
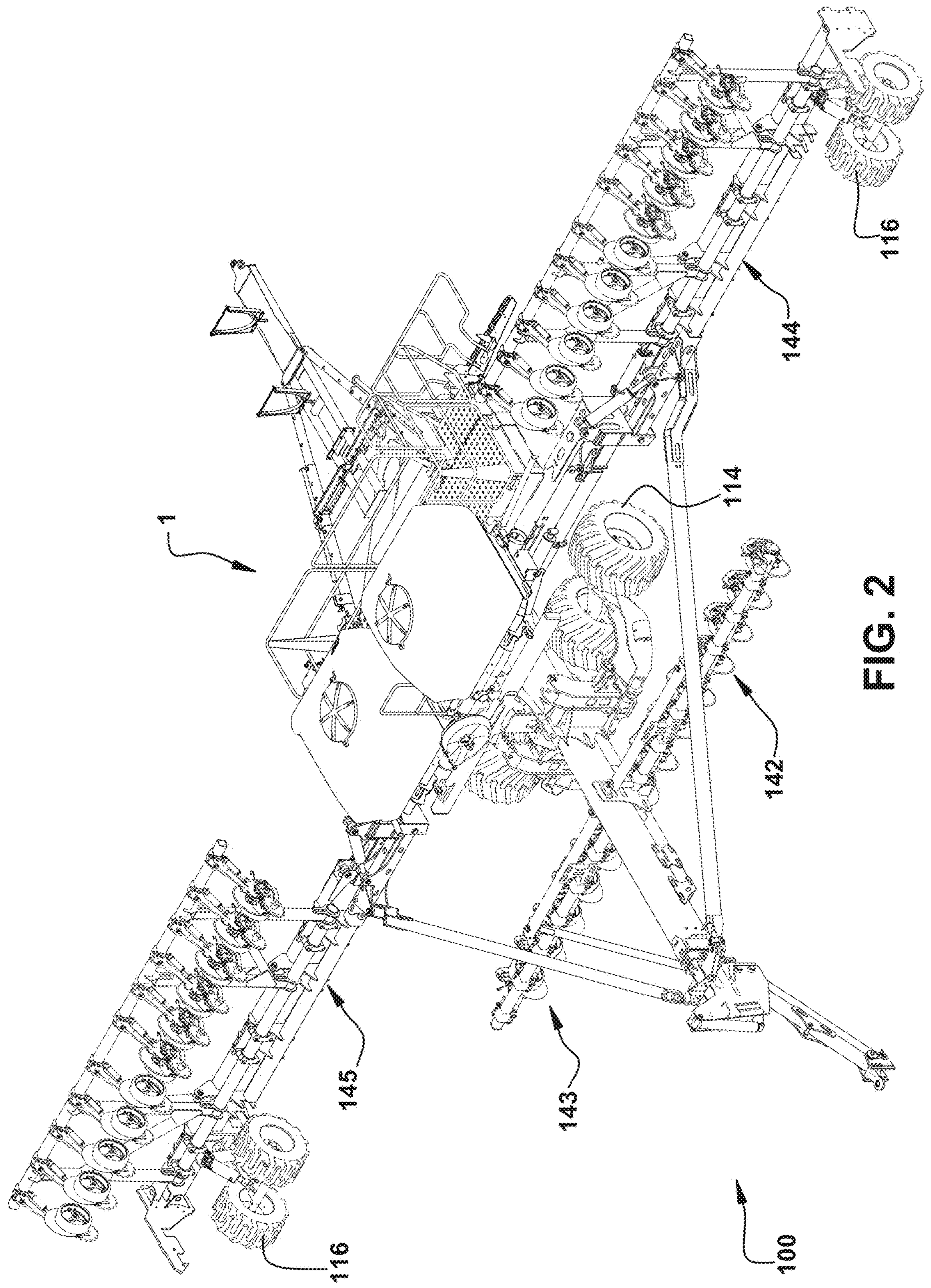
FIG. 2 is a front-side perspective view of the multi-rank agricultural implement of FIG. 1 disposed in an unfolded non-operational conformation in accordance with an example embodiment.

In the example implementation, the first portion 122*a* of the first tool bar 122 is movable relative to the first portion 124*a* of the second tool bar 124 by a first set of one or more actuators 136 between a lowered operational or deployed position as shown in FIG. 1 and a raised non-operational or transport or storage position as shown in FIG. 2. Similarly in the implementation illustrated, the second portion 122*b* of the first tool bar 122 is movable relative to the second portion 124*b* of the second tool bar 124 by a second set of one or more actuators 138 between a lowered operational or deployed position as shown in FIG. 1 and a raised non-operational or transport or storage position as shown in FIG. 2. In this way, the first set of one or more actuators 136 are used to effect movement of the first portion 122*a* of the first tool bar 122 relative to the first portion 124*a* of the second tool bar 124 about the first axis W and through the first arc Y between the lowered, operational or deployed conformation of the first portion 122*a* of the first tool bar 122 as shown in FIG. 1 and the raised, non-operational or retracted conformation of the first portion 122*a* of the first tool bar 122 as shown in FIG. 2. Also in this way, the second set of one or more actuators 138 are used to effect movement of the second portion 122*b* of the first tool bar 122 relative to the second portion 124*b* of the second tool bar 124 about the second axis X and through the second arc Z between the lowered, operational or deployed conformation of the second portion 122*b* of the first tool bar 122 as shown in FIG. 1 and the raised, non-operational or retracted conformation of the second portion 122*b* of the first tool bar 122 as shown in FIG. 2. In the example embodiment, the first set of one or more actuators 136 are a first set of one or more hydraulic and/or electric actuators 137 for moving the first portion 122*a* of the first tool bar 122 relative to the first portion 124*a* of the second tool bar 124. Similarly, the second set of one or more actuators 138 are a second set of one or more hydraulic and/or electric actuators 139 for moving the second portion 122*b* of the first tool bar 122 relative to the second portion 124*b* of the second tool bar 124.

In the example embodiment, the third portion 122*c* of the first tool bar 122 is formed by a first sub-portion 122*ca* pivotably coupled with the main frame 104 of the main carrier 102, and a second sub-portion 122*cb* also pivotably coupled with the main frame 104 of the main carrier 102. The first sub-portion 122*ca* of the first tool bar 122 is pivotable relative to the main frame 104 about an axis L that is vertical as viewed in the drawing figure and is movable through an arc N, wherein the axis L is substantially perpendicular to the main axis F of the implement 100 and wherein the arc N lies in a generally horizontal plane that is substantially parallel with the ground beneath the implement and that includes the main axis F and includes the main carrier 102 of the implement 100. The second sub-portion 122*cb* of the first tool bar 122 is similarly pivotable relative to the main frame 104 about an axis M that is vertical as viewed in the drawing figure and is movable through an arc O, wherein the axis M is substantially perpendicular to the main axis F of the implement 100 and wherein the arc O lies in a generally horizontal plane that is substantially parallel with the ground beneath the implement and that includes the main axis F and includes the main carrier 102 of the implement 100. In the example illustrated, the axes L and M are mutually parallel for the implement 100 in either the folded conformation, or the unfolded conformation, and also for the implement being disposed between the folded or unfolded conformations. Similarly in the example illustrated, the arcs N and O are mutually co-planar for the implement 100 in either the folded conformation, or the unfolded conformation, and also for the implement being disposed between the folded or unfolded conformations.

In the example embodiment, the first sub-portion 122*ca* of the first tool bar 122 together with the set of fertilizer row units 131 carried thereon form, collectively, a first sequenced wing 142 of the implement 100. Similarly, the second sub-portion 122*cb* of the first tool bar 122 together with the set of fertilizer row units 131 carried thereon form, collectively, a second sequenced wing 143 of the implement 100.

Also in the example implementation, the first portion 124*a* of the second tool bar 124 together with the set of seeder row units 133 and the first portion 122*a* of the first tool bar 122 carried thereon form, collectively, a first direct linkage wing 144 of the implement 100. Similarly, the second portion 124*b* of the second tool bar 124 together with the set of seeder row units 133 and the second portion 122*b* of the first tool bar 122 carried thereon forms, collectively, a second rearward wing 145 of the implement 100.

In accordance with an aspect of this disclosure an agricultural implement 100 comprises: an elongate main carrier 102 defining a main axis F of the agricultural implement 100; a first sequenced wing 142 comprising a first sub-portion 122*ca* of a first discontinuous tool bar 122 pivotably coupled with the main carrier 102, wherein the first tool bar 122 comprises a first portion 122*a*, a second portion 122*b*, the first sub-portion 122*ca*, and a second sub-portion 122*cb*; a second sequenced wing 143 comprising the second sub-portion 122*cb* of the first tool bar 122 pivotably coupled with the main carrier 102 on a side of the main carrier opposite from the first sequenced wing 142; a first direct wing 144 comprising a first portion 124*a* of a second discontinuous tool bar 124 pivotably coupled with the main carrier 102, the second tool bar 124 comprising the first portion 124*a* and a second portion 124*b*; and a second direct wing 145 comprising the second portion 124*b* of the second tool bar 124 pivotably coupled with the main carrier 102 on a side of the main carrier opposite from the first direct wing 144, wherein the first and second portions 124*a*, 124*b* of the second tool bar 124 comprising the first and second direct wings 144, 145 are pivotable relative to the main frame 102 between folded and unfolded positions respectively about axes A, B that extend perpendicularly relative to a longitudinal plane containing the main axis F and the main carrier 102 of the agricultural implement 100, wherein the first and second sub-portions 122*ca*, 122*cb* of the first tool bar 122 comprising the first and second sequenced wings 142, 143 are pivotable relative to the main frame 102 between folded and unfolded positions respectively about axes L, M that extend perpendicularly relative to the longitudinal plane of the agricultural implement 100, wherein the first portion 122*a* of the first tool bar 122 of the first sequenced wing 142 is pivotably coupled with the first portion 124*a* of the second tool bar 124, wherein the second portion 122*b* of the first tool bar 122 of the second sequenced wing 143 is pivotably coupled with the second portion 124*b* of the second tool bar 124, wherein the first and second portions 122*a*, 122*b* of the first tool bar 122 are pivotable relative to the second tool bar 124 respectively about axes W, Z that extend in parallel with the longitudinal plane of the agricultural implement 100. In addition in the example implementation, the first and second portions of the first tool bar are pivotable relative to the second tool bar respectively about axes that extend in parallel with the longitudinal plane of the agricultural implement for any position and/or orientation of the first portion of the second tool bar relative to the main carrier and for any position and/or orientation of the second portion of the second tool bar relative to the main carrier.

In any of the embodiments of the agricultural implement 100 according to this disclosure, the first and second subportions 122*ca*, 122*cb* of the first tool bar 122 are pivotable relative to the main frame 102 respectively through arcs N, O that lie in general in the longitudinal plane of the agricultural implement 100; the first and second portions 124*a*, 124*b* of the second tool bar 124 are pivotable relative to the main frame 102 respectively through arcs C, D that lie in general in the longitudinal plane of the agricultural implement 100; and the first and second portions 122*a*, 122*b* of the first toll bar 122 are pivotable relative to the first and second portions 124*a*, 124*b*, respectively, of the second tool bar 124 through arcs Y, Z that lie in general in vertical planes perpendicular to the longitudinal plane of the agricultural implement 100.

In any of the embodiments according to this disclosure, the agricultural implement 100 further comprises: a first set of one or more actuators 136 configured to pivot the first portion 122*a* of the first tool bar 122 relative to the first portion 124*a* of the second tool bar 124; and a second set of one or more actuators 138 configured to pivot the second portion 122*b* of the first tool bar 122 relative to the second portion 124*b* of the second tool bar 124.

In any of the embodiments of the agricultural implement 100 according to this disclosure, the main carrier 102 comprises a main frame 104 and a draw member 106 slidably coupled with the main frame for movement relative to the main frame between an extended position and a retracted position, the draw member 106 having opposite first and second ends 106*a*, 106*b*; and the agricultural implement 100 further comprises: a bumper member 152 connected with the draw member 106 adjacent the first end 106*a* of the draw member 106*a*; a trip member 154 connected with the draw member 106 between the bumper member 152 and the second end 106*b* of the draw member 106; an attachment member 150 slidably connected with the draw member 106, the attachment member being slidable relative to the draw member for a portion of the draw member extending between the trip member 154 and the bumper member 152; a first sequenced draft link 160 having a first end 160*a* pivotably connected with the first sequenced wing 142 and a second end 160*b* pivotably connected with the attachment member 150; and a second sequenced draft link 161 having a first end 161*a* pivotably connected with the second sequenced wing 143 and a second end 161*b* pivotably connected with the attachment member 150, wherein relative movement between the draw member 106 and the main frame 104 from the retracted position to a folding intermediate position between the retracted position and the extended position causes at the folding intermediate position a mutual contact between the trip member 154 and the attachment member 150, wherein relative movement between the draw member 106 and the main frame 104 from the folding intermediate position towards the extended position pivots the first and second sequenced wings 142, 143 towards the folded position by the mutual contact between the trip member 154 and the attachment member 150, wherein relative movement between the draw member 106 and the main frame 104 from the extended position to an opening intermediate position causes the trip member 154 and the attachment member 150 to mutually separate and causes at the opening intermediate position a mutual contact between the bumper member 152 and the attachment member 150, wherein relative movement between the draw member 106 and the main frame 104 from the opening intermediate position to the retracted position pivots the first and second sequenced wings 142, 143 towards the unfolded position by the mutual contact between the bumper member 152 and the attachment member 150.

In any of the embodiments according to this disclosure, the agricultural implement 100 further comprises: a first direct draft link 162 having a first end 162*a* pivotably connected with the first direct wing 144 and a second end 162*b* pivotably connected with the draw member 106; and a second direct draft link 163 having a first end 163*a* pivotably connected with the second direct wing 145 and a second end 163*b* pivotably connected with the draw member 106, wherein relative movement between the draw member 106 and the main frame 104 towards the retracted position pivots the first and second direct wings 144, 145 into their respective unfolded positions; wherein relative movement between the draw member 106 and the main frame 104 towards the extended position pivots the first and second direct wings 144, 145 towards their respective folded positions.

In any of the embodiments of the agricultural implement 100 according to this disclosure, relative movement between the draw member 106 and the main frame 104 from the retracted position to the folding intermediate position between the retracted position and the extended position causes no motion of the first or second sequenced wings 142, 143 by the slidable coupling between the draw member 106 and the main frame 104, and relative movement between the draw member 106 and the main frame 104 from the extended position to the opening intermediate position causes no motion of the first or second sequenced wings 142, 143 by the slidable coupling between the draw member 106 and the main frame 104.

Figure 3:
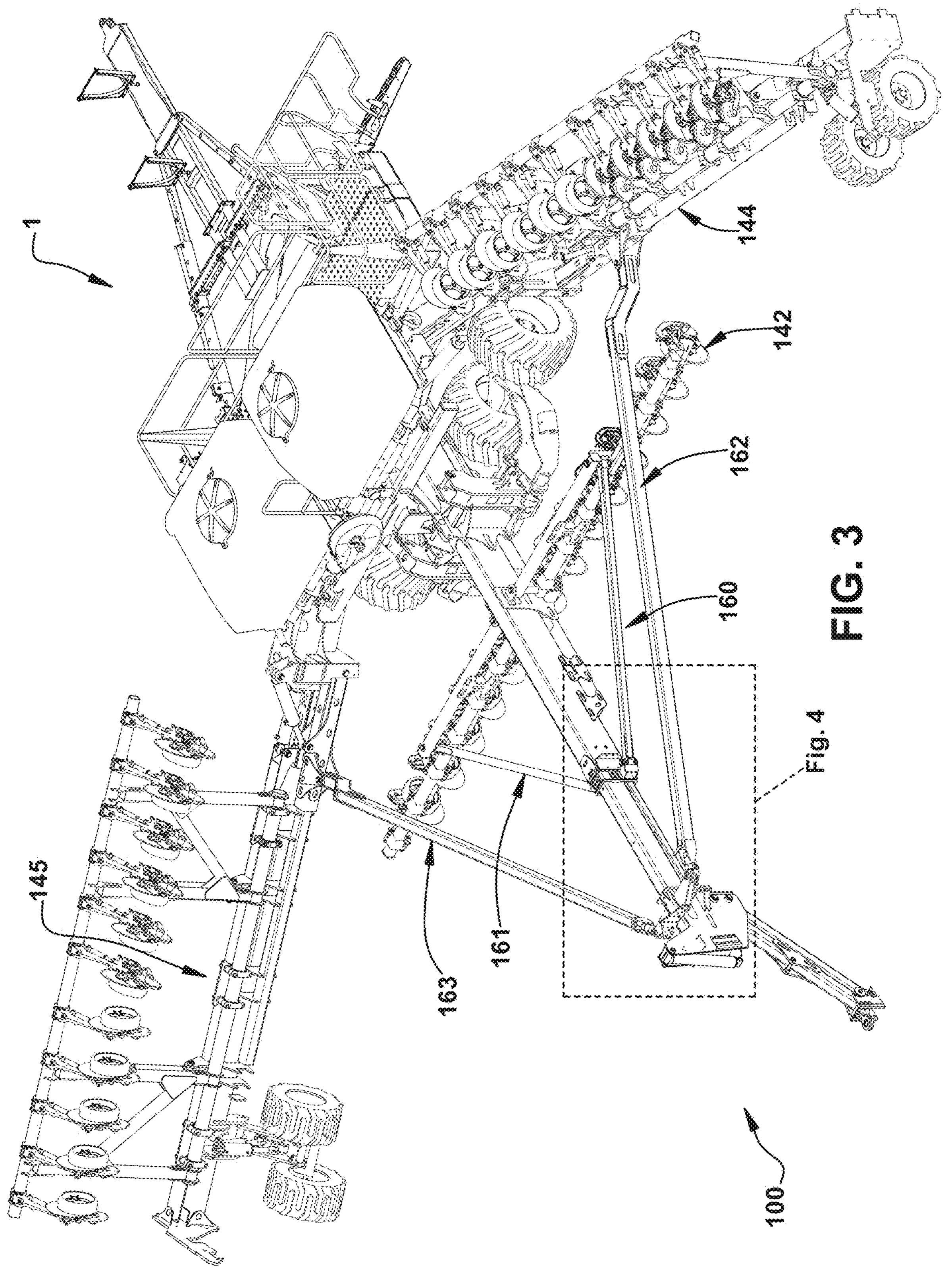
FIG. 3 is a front-side perspective view of the multi-rank agricultural implement of FIG. 1 disposed in a partially folded non-operational conformation in accordance with an example embodiment.
Figure 4:
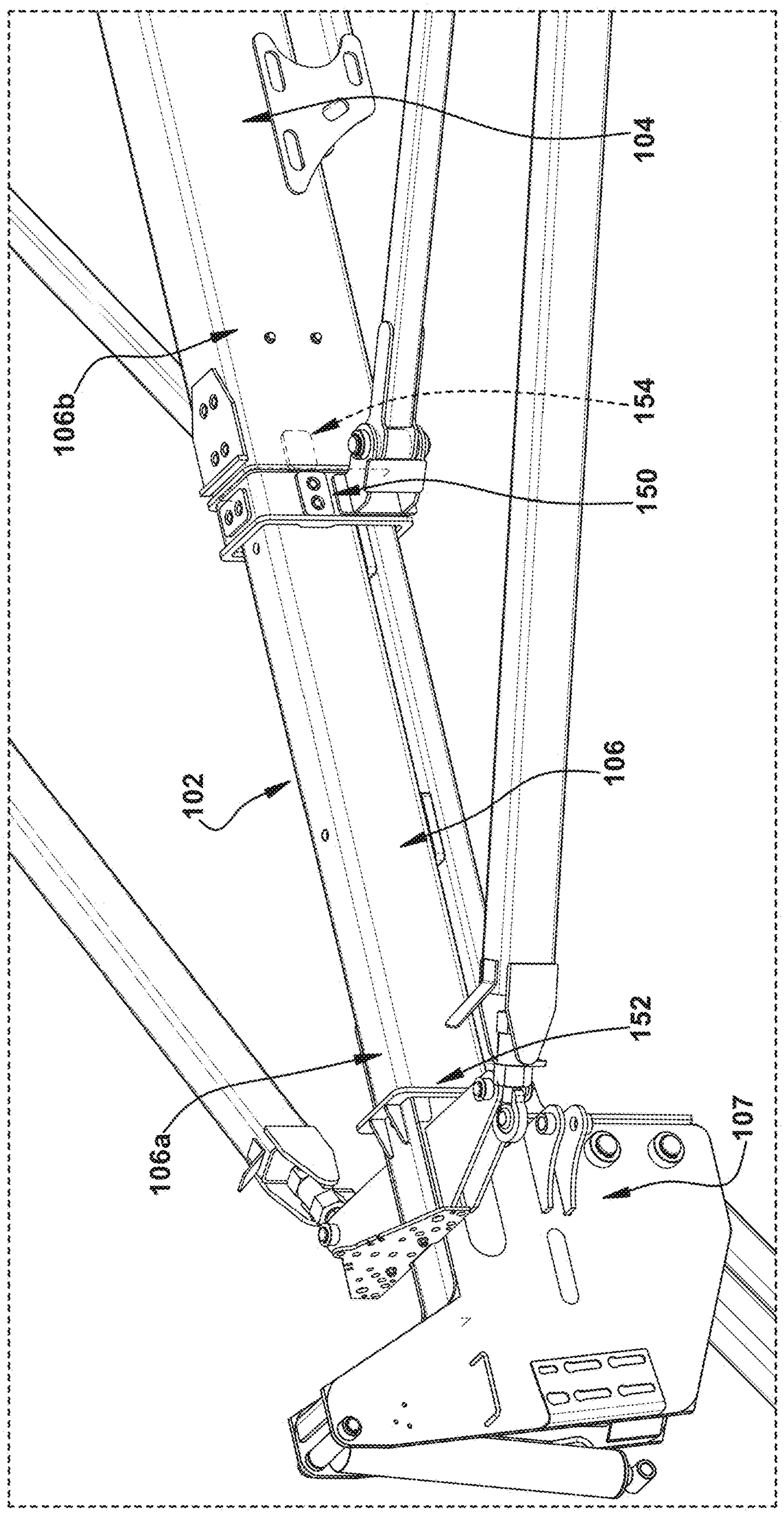
FIG. 4 is an enlarged front-side perspective view of a portion of the multi-rank agricultural implement of FIG. 1 taken from FIG. 3 and with the implement disposed in the partially folded non-operational conformation.
Figure 5:
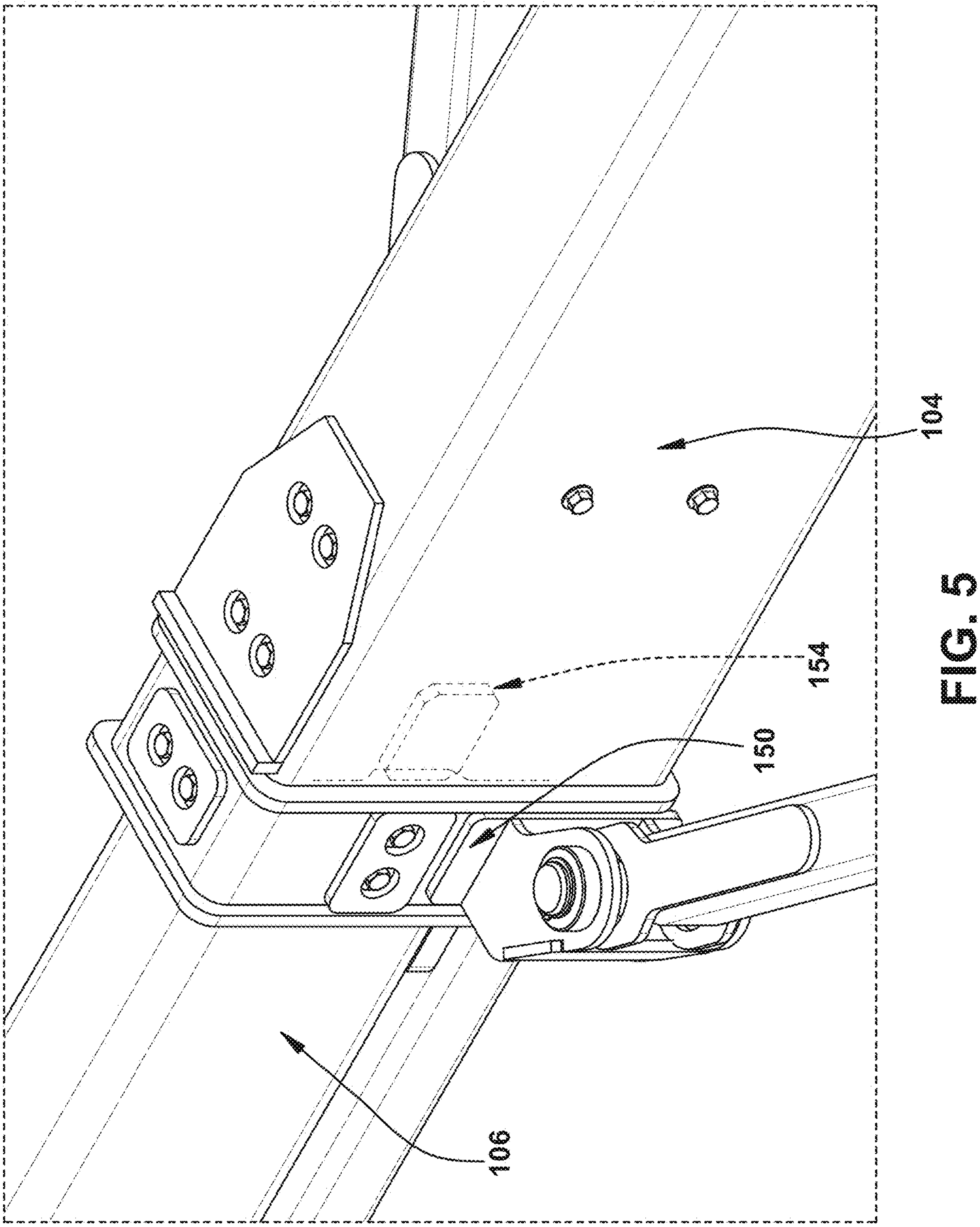
FIG. 5 is an enlarged rear-side perspective partially phantom view of a portion of the multi-rank agricultural implement taken from FIG. 4 and with the implement disposed in the partially folded non-operational conformation.
Figure 6:
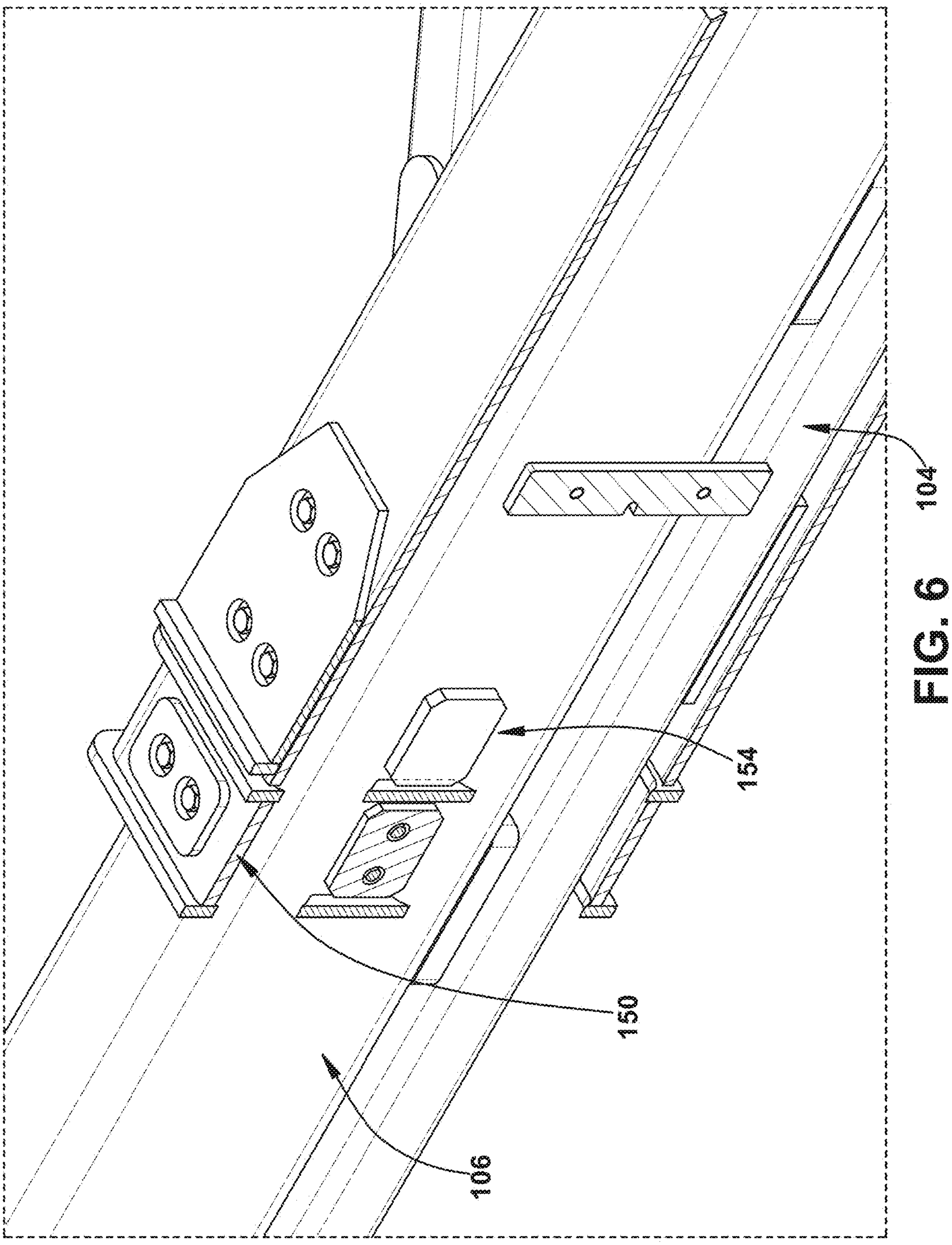
FIG. 6 is a cross-sectional partial phantom view taken along line 6-6 of FIG. 5.

With reference now to FIGS. 4, 5, and 6 wherein FIG. 4 is an enlarged front-side perspective view of a portion of the multi-rank agricultural implement of FIG. 1 taken from FIG. 3 and with the implement disposed in the partially folded non-operational conformation, FIG. 5 is an enlarged rear-side perspective partially phantom view of a portion of the multi-rank agricultural implement taken from FIG. 4 and with the implement disposed in the partially folded non-operational conformation, and FIG. 6 is a cross-sectional partial phantom view taken along line 6-6 of FIG. 5, the attachment member 150 is slidably connected with the draw member 106 as best shown in FIGS. 4 and 5 for pivotably moving the first and second subsections 122*ca*, 122*cb* of the first tool bar 122, wherein a first sequenced draft link 160 couples the first subsection 122*ca* with the attachment member 150 and a second forward draft link 162 couples the second subsection 122*cb* with the attachment member 150. More particularly, the first forward draft link 160 has a first end 160*a* pivotably connected with the first subsection 122*ca* of the first tool bar 122, and a second end 160*b* pivotably connected with the attachment member 150. Similarly, the second forward draft link 162 has a first end 162*a* pivotably connected with the second subsection 122*cb* of the first tool bar 122, and a second end 162*b* pivotably connected with the attachment member 150.

As best shown in FIG. 4, draw member 106 has opposite first 106*a* and second 106*b* ends, wherein the first end 106*a* is adapted for selective connection with an associated tow vehicle via the tongue 110 and latch 112. Also as shown in those Figures, a bumper member 152 is fixedly carried on the draw member 106 adjacent the first end 106*a* thereof. In addition, a trip member 154 is disposed on the draw member 106 between the bumper member 152 and the second end 106*b* of the draw member 106. As described, the attachment member 150 is slidably connected with the draw member 106, wherein the attachment member 150 and the draw member 106 are mutually slidable for a portion of the draw member 106 extending between the trip member 154 and the bumper member 152.

In the example embodiment, motion between the attachment member 150 and the main frame 104 establishes pivotable movement between the first and second subsections 122*ca*, 122*cb* of the first tool bar 122 and the main frame 104 by the pivotable coupling of the first and second subsections 122*ca*, 122*cb* with the main frame 104 and also by the coupling of the first and second subsections 122*ca*, 122*cb* with the attachment member 150 via the first and second sequenced draft links 160, 161, respectively. However, since the attachment member 150 is not fixed immovably to the draw member 106, but rather the attachment member 150 and the draw member 106 are mutually slidable for a portion of the draw member 106 extending between the trip member 154 and the bumper member 152, the pivotable movement of the first and second subsections 122*ca*, 122*cb* is non-linearly related to the movement between the draw member 106 and the main frame 104 of the main carrier 102.

Also in the example embodiment, motion between the attachment member 150 and the main frame 104 establishes pivotable movement between the first and second portions 124*a*, 124*b* of the second tool bar 124 and the main frame 104 by the pivotable coupling of the first and second portions 124*a*, 124*b* with the main frame 104 and also by the coupling of the first and second portions 124*a*, 124*b* with the attachment member 150 via the first and second direct draft links 162, 163, respectively. Since the first and second direct draft links 162, 163 are connected directly with a head member 107 located at or on the tow bar or tongue 110, the pivotable movement of the first and second portions 124*a*, 124*b* is linearly related to the movement between the draw member 106 and the main frame 104 of the main carrier 102.

Figure 7A:
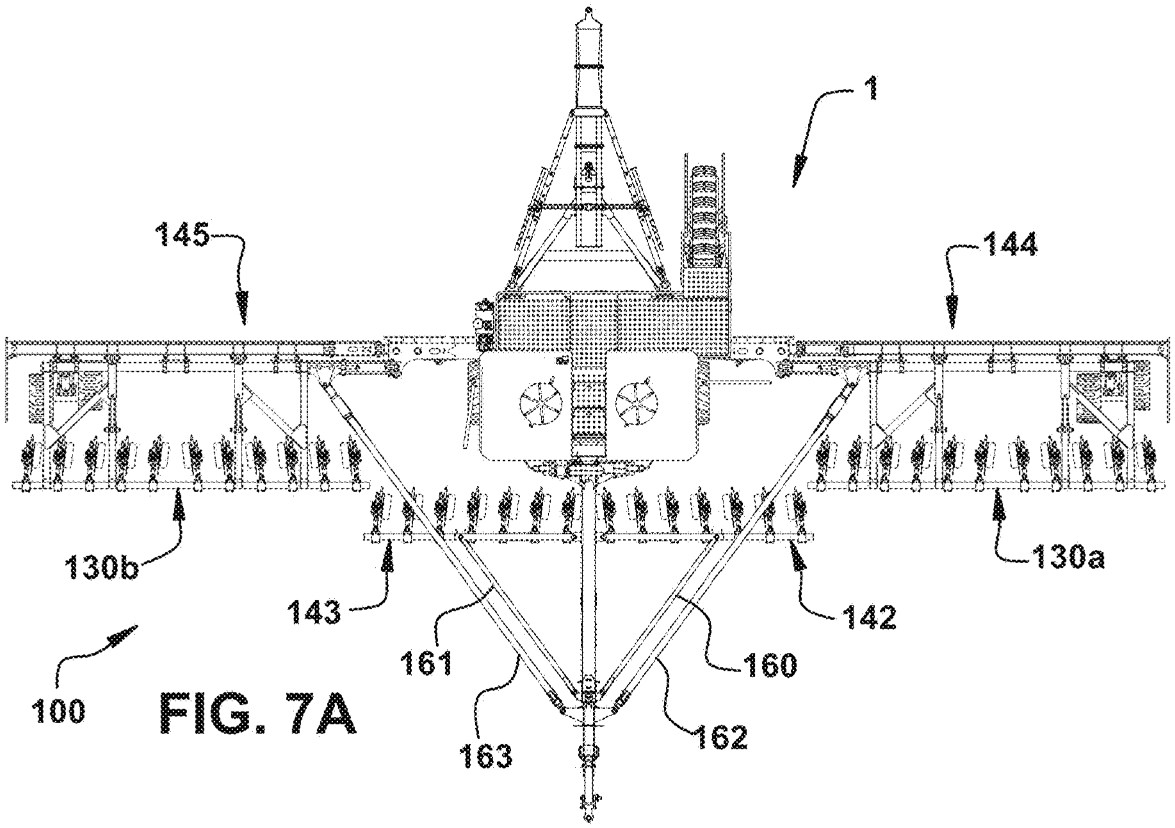
FIG. 7A is a top plan view of the multi-rank agricultural implement disposed in the unfolded and operational or deployed conformation as shown in FIG. 1.
Figure 7B:
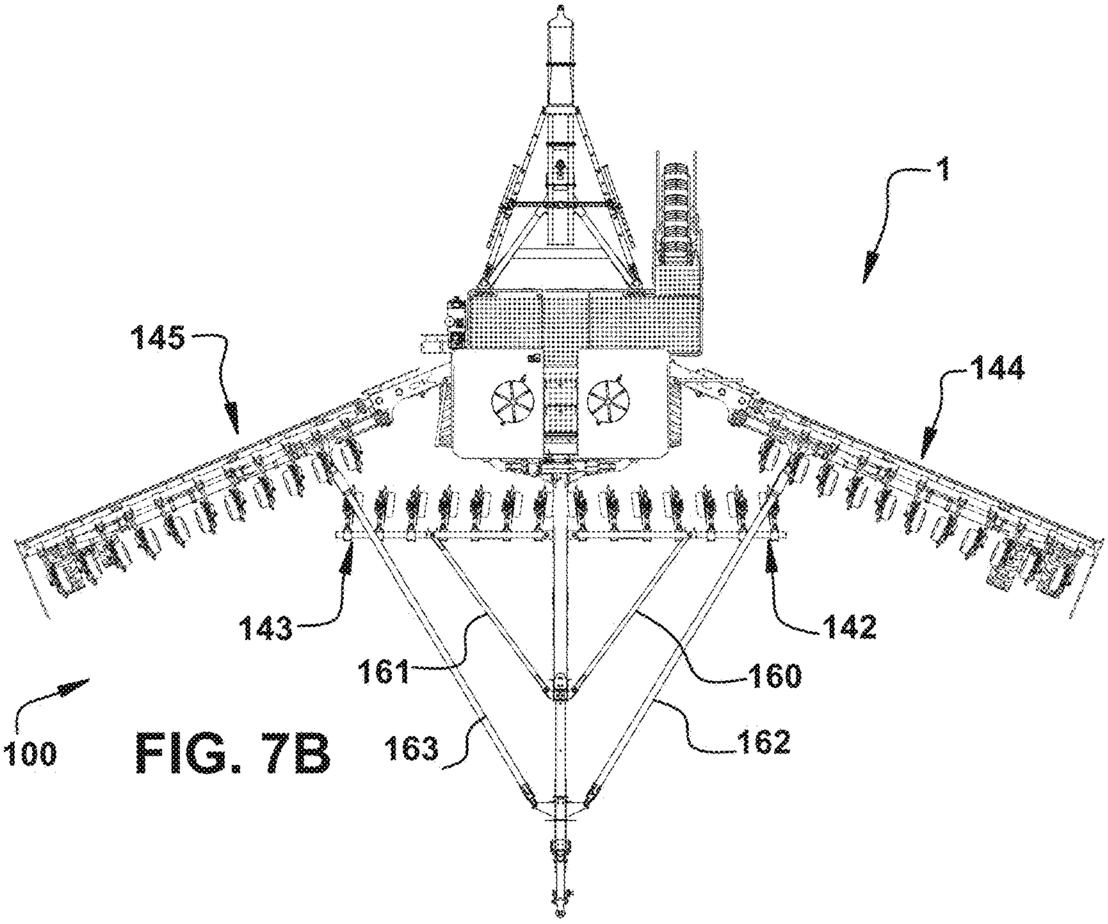
FIG. 7B is a top plan view of the multi-rank agricultural implement disposed in the partially folded non-operational conformation as shown in FIG. 3.
Figure 7D:
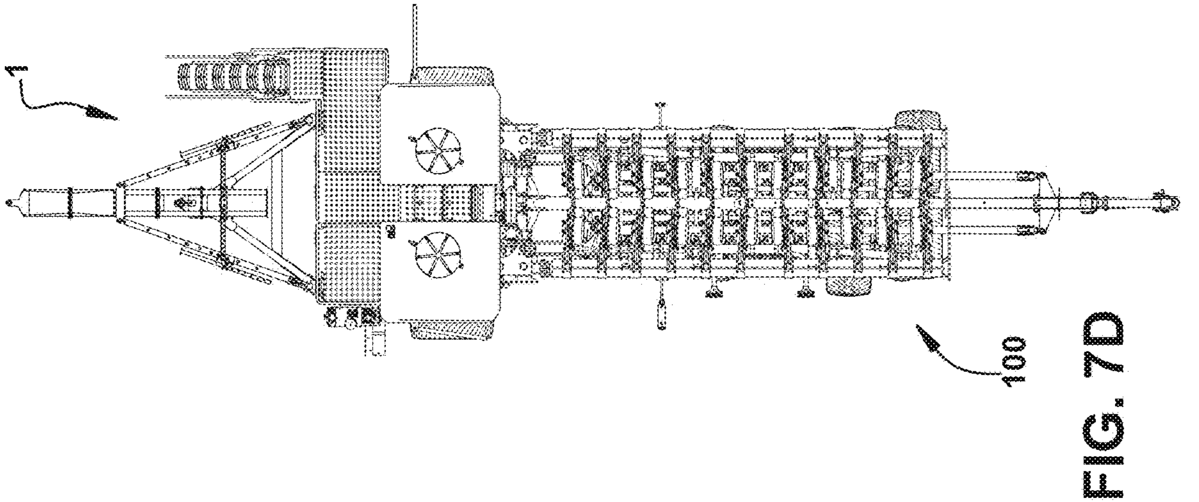
FIG. 7D is a top plan view of the multi-rank agricultural implement disposed in a fully folded non-operational closed or stowed conformation in accordance with an example embodiment.
Figure 7C:
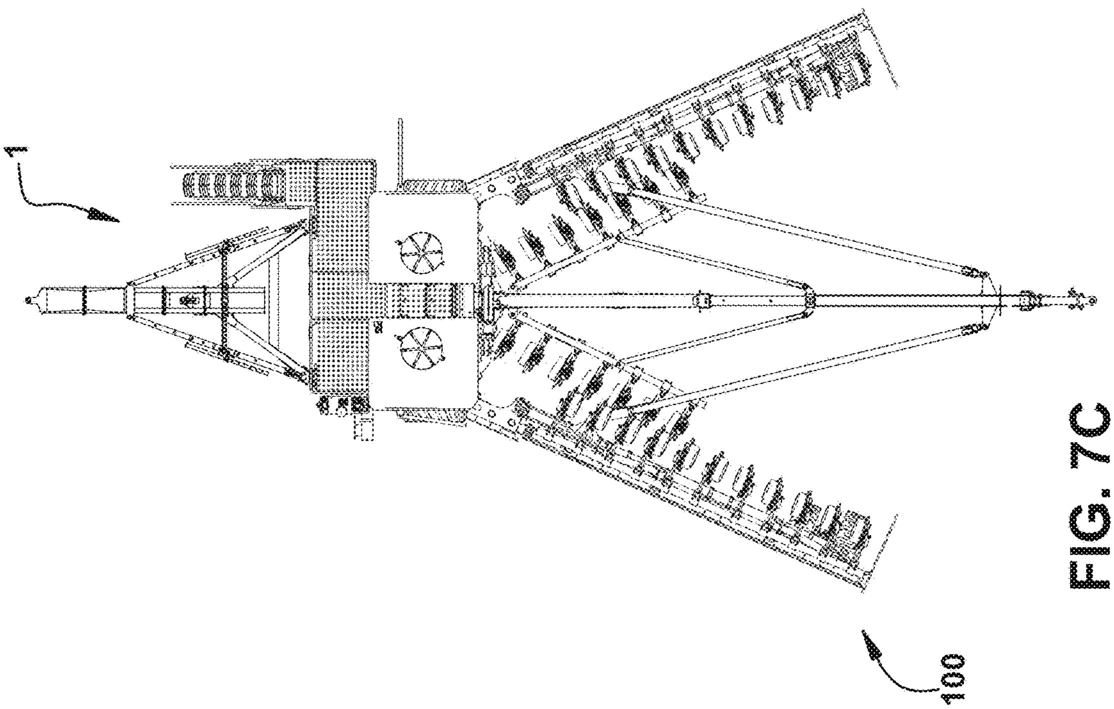
FIG. 7C is a top plan view of the multi-rank agricultural implement disposed in a partially folded non-operational intermediate conformation in accordance with an example embodiment.
Figure 8:
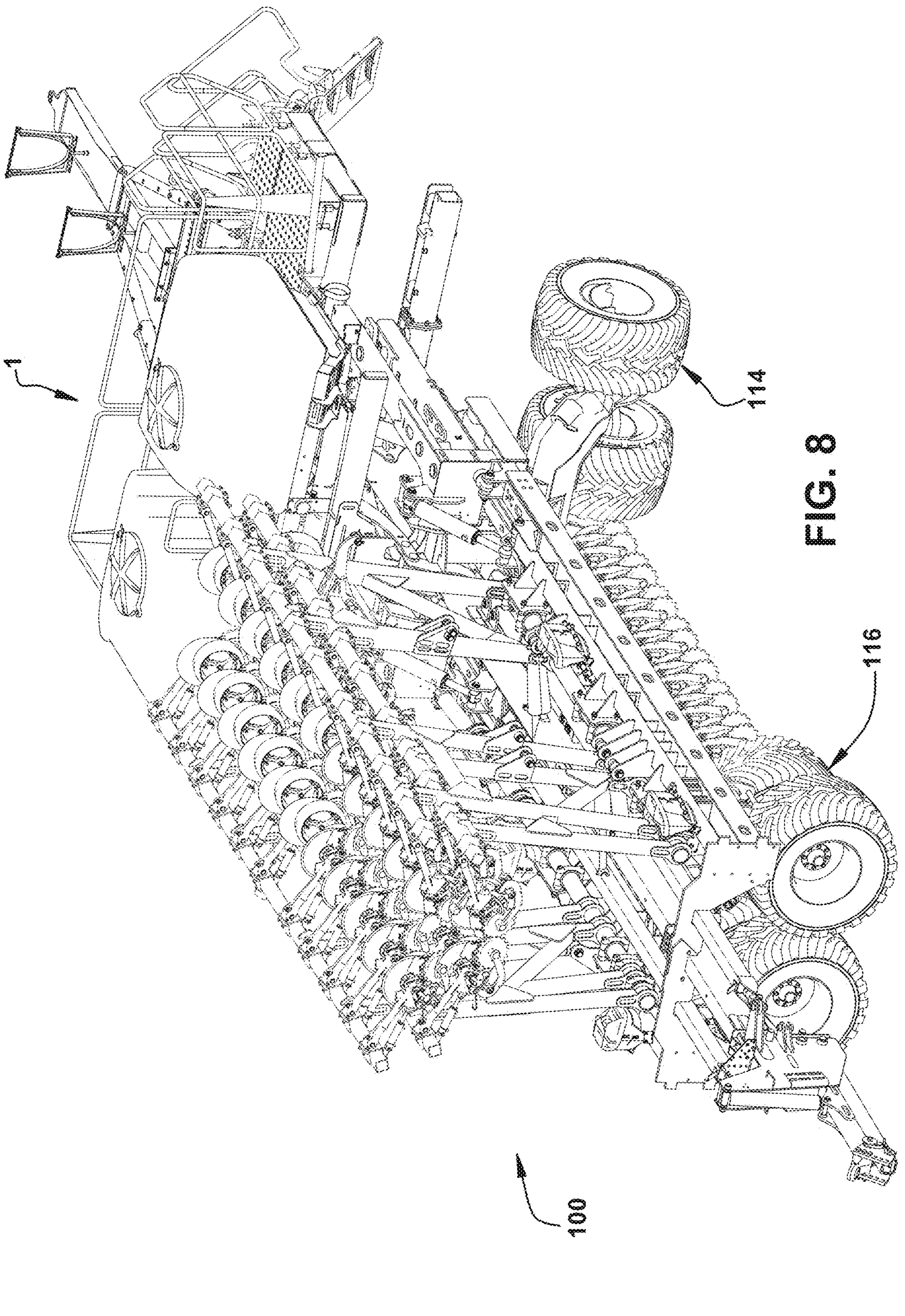
FIG. 8 is a front-side perspective view of the multi-rank agricultural implement of FIG. 1 disposed in the fully folded non-operational closed or stowed conformation as shown in FIG. 7D.

FIGS. 7A-7D illustrate a sequence for transitioning the implement 100 in accordance with the example embodiment from an unfolded and operational or deployed conformation such as shown in FIG. 1 for example to a fully folded non-operational closed or stowed conformation as shown in FIG. 8, wherein FIG. 7A is a top plan view of the multi-rank agricultural implement disposed in the unfolded and operational or deployed conformation, FIG. 7B is a top plan view of the multi-rank agricultural implement disposed in the partially folded non-operational conformation, FIG. 7C is a top plan view of the multi-rank agricultural implement disposed in a partially folded non-operational intermediate conformation, and FIG. 7D is a top plan view of the multi-rank agricultural implement disposed in a fully folded non-operational closed or stowed conformation.

Before moving the first and second portions 124*a*, 124*b* comprising the first and second direct wings 144, 145, the first and second portions 122*a*, 1242 of the first tool bar 122 are rotated upwardly about axes W, X respectively as shown between FIGS. 7A and 7B and as also shown in FIGS. 2 and 3. For this a first set of one or more actuators 136 are configured to pivot the first portion 122*a* of the first tool bar 122 relative to the first portion 124*a* of the second tool bar 124, and a second set of one or more actuators 138 are configured to pivot the second portion 122*b* of the first tool bar 122 relative to the second portion 124*b* of the second tool bar 124. In the example embodiment, the first set of one or more actuators 136 are a first set of one or more hydraulic and/or electric actuators 137 for moving the first portion 122*a* of the first tool bar 122 relative to the first portion 124*a* of the second tool bar 124. Similarly, the second set of one or more actuators 138 are a second set of one or more hydraulic and/or electric actuators 139 for moving the second portion 122*b* of the first tool bar 122 relative to the second portion 124*b* of the second tool bar 124.

Thereafter and in accordance with the example embodiment, relative movement between the draw member 106 and the main frame 104 from the retracted position such as shown in FIG. 7A to a folding intermediate position between the retracted position and the extended position such as shown in FIG. 7B causes at the folding intermediate position a mutual contact between the trip member 154 and the attachment member 150. In the meantime, and since the first and second direct wings 144, 145 are directly coupled with the head member 107, the first and second direct wings 144, 145 are moved from the orientations as shown in FIG. 7A to the orientations as shown in FIG. 7B. It is to be appreciated that the first and second sequenced wings 142, 143 are not moved for the draw member 106 being moved from the retracted position such as shown in FIG. 7A to a folding intermediate position between the retracted position and the extended position such as shown in FIG. 7B because the first and second sequenced wings 142, 143 are coupled with the attachment member 150 that is slidably connected with the draw member 106, wherein the attachment member is slidable relative to the draw member for a portion of the draw member extending between the trip member 154 and the bumper member 152.

Thereafter and as shown in FIG. 7C, relative movement between the draw member 106 and the main frame 104 from the folding intermediate position of FIG. 7B towards the extended position as shown in FIGS. 7D and 8, pivots the first and second sequenced wings 142, 143 towards their respective folded positions by the mutual contact between the trip member 154 and the attachment member 150.

Figure 9A:
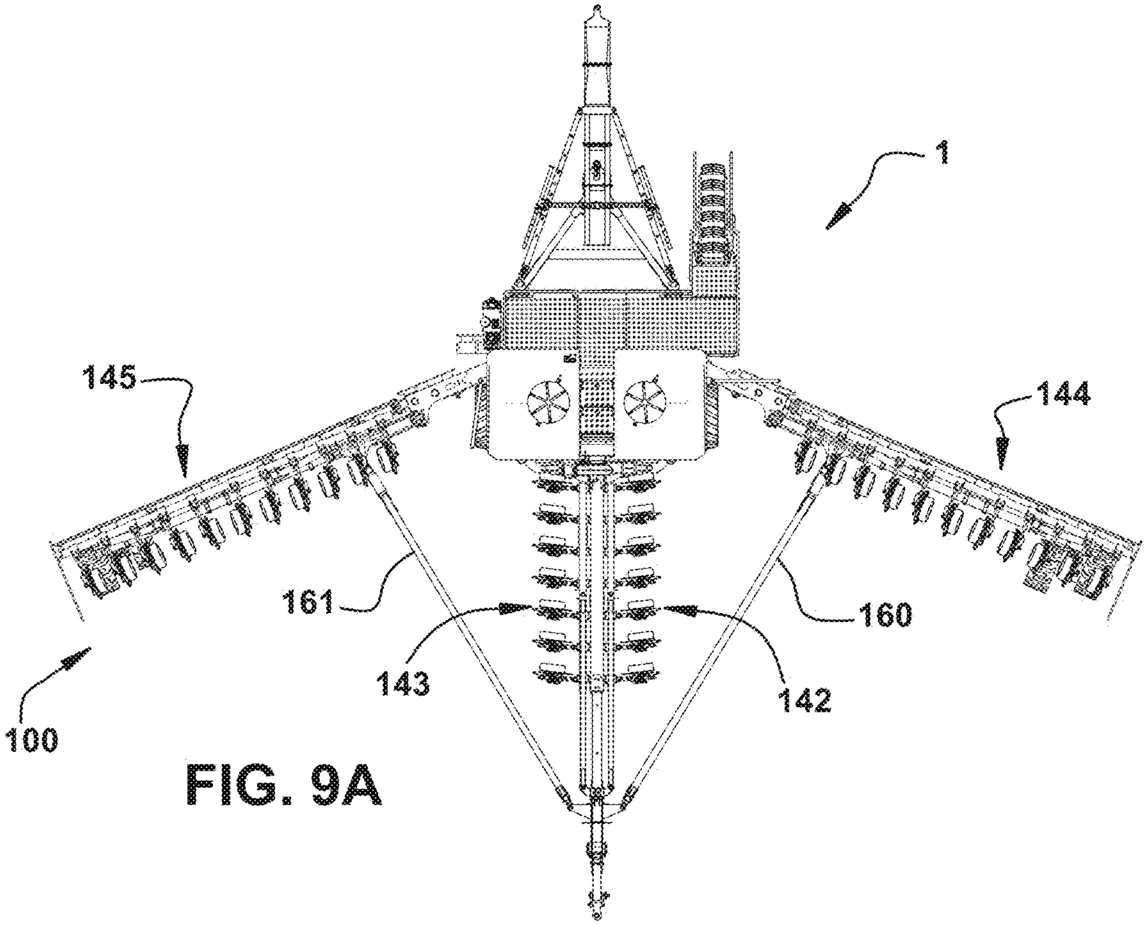
FIG. 9A is a top plan view of the multi-rank agricultural implement disposed in a partially opened non-operational intermediate conformation in accordance with an example embodiment.
Figure 9B:
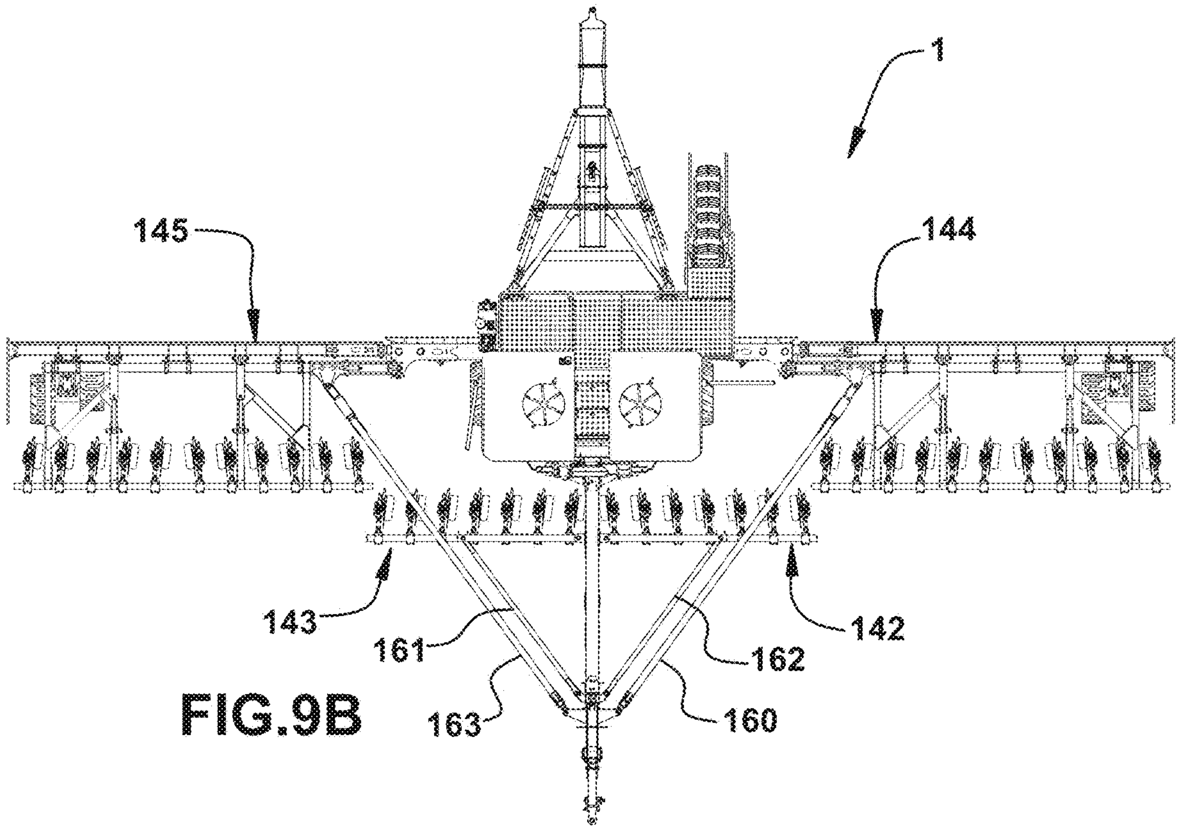
FIG. 9B is a top plan view of the multi-rank agricultural implement disposed in the unfolded and operational or deployed conformation of FIG. 1.
Figure 10:
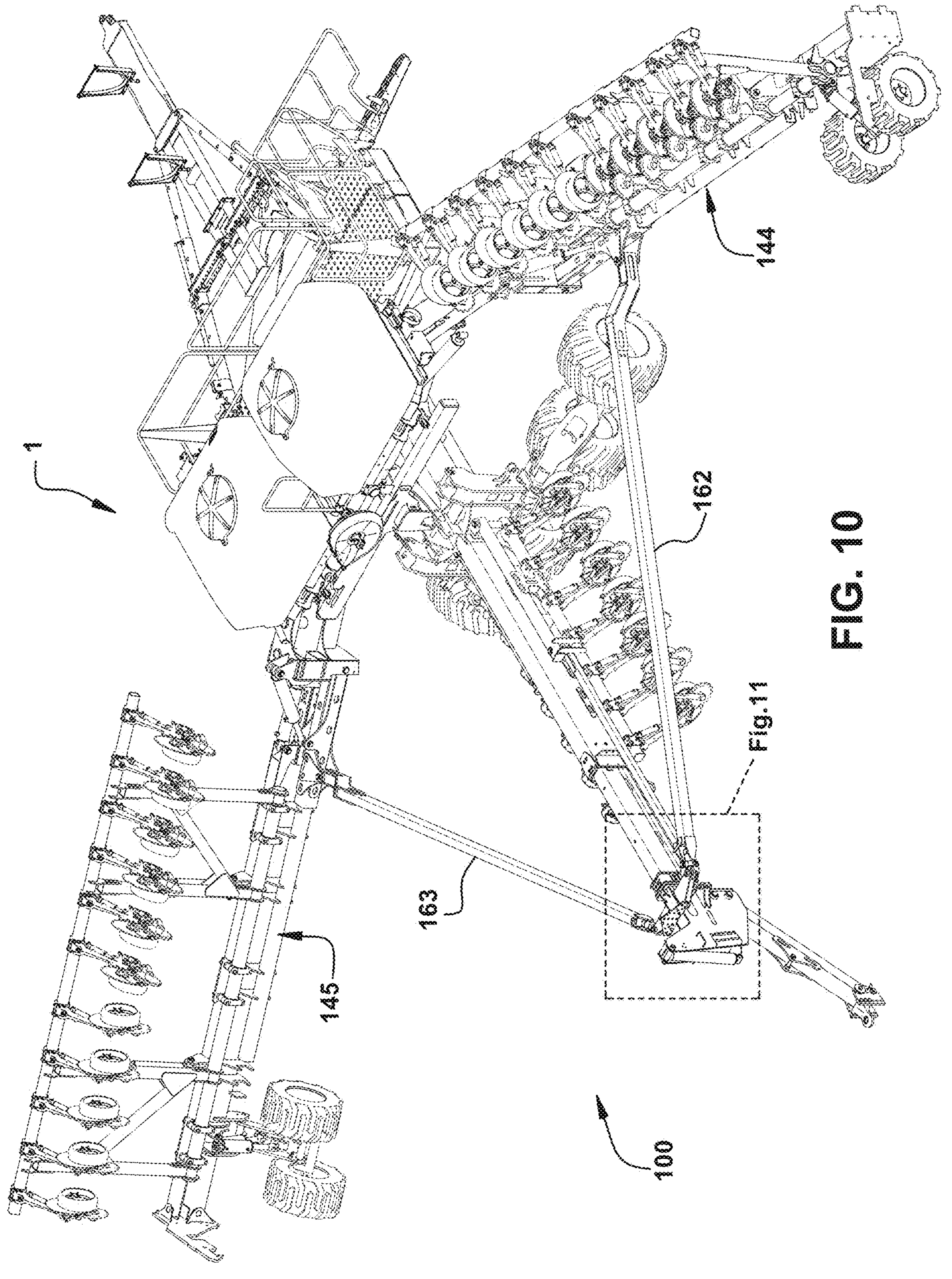
FIG. 10 is a front-side perspective view of the multi-rank agricultural implement of FIG. 1 disposed in the partially opened non-operational intermediate conformation of FIG. 9A in accordance with an example embodiment.

FIGS. 9A, 9B, 10 and 11 illustrate a sequence for transitioning the implement 100 in accordance with the example embodiment from the fully folded non-operational closed or stowed conformation as shown in FIG. 8 to the unfolded and operational or deployed conformation such as shown in FIG. 1 for example, wherein FIG. 9A is a top plan view of the multi-rank agricultural implement disposed in a partially opened non-operational intermediate conformation in accordance with an example embodiment, FIG. 9B is a top plan view of the multi-rank agricultural implement disposed in the unfolded and operational or deployed conformation of FIG. 1, FIG. 10 is a front-side perspective view of the multi-rank agricultural implement of FIG. 1 disposed in the partially opened non-operational intermediate conformation of FIG. 9A in accordance with an example embodiment, and FIG. 1 is an enlarged front-side perspective view of a portion of the multi-rank agricultural implement of FIG. 1 taken from FIG. 10 and with the implement disposed in the partially opened non-operational intermediate conformation as shown in FIG. 10.

Figure 11:
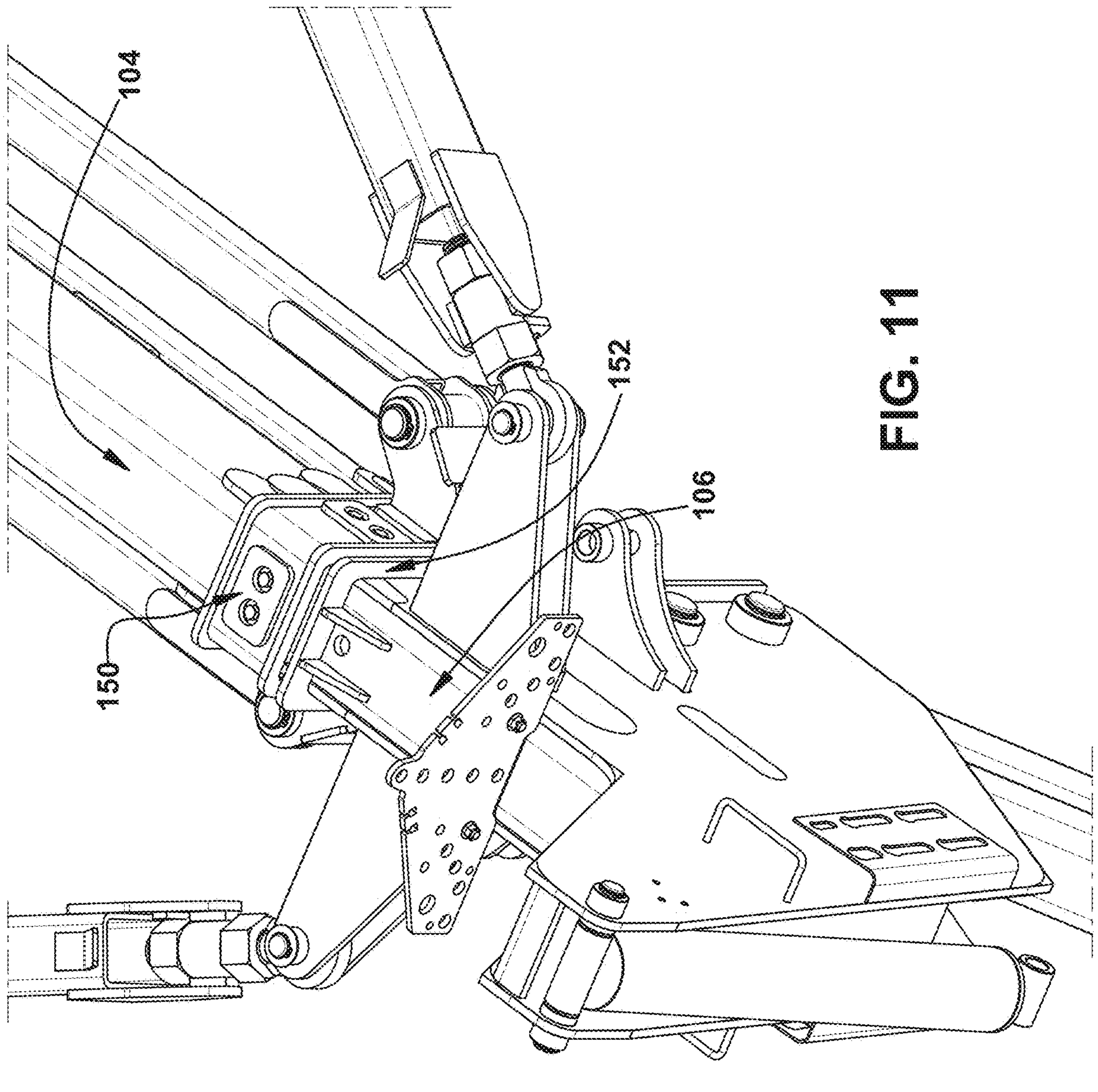
FIG. 11 is an enlarged front-side perspective view of a portion of the multi-rank agricultural implement of FIG. 1 taken from FIG. 10 and with the implement disposed in the partially opened non-operational intermediate conformation as shown in FIG. 10.

As shown, relative movement between the draw member 106 and the main frame 104 from the extended position such as shown in FIGS. 7D and 8 to an opening intermediate position such as shown in FIGS. 9A, 10, and 11 causes the trip member 154 and the attachment member 150 to mutually separate and causes at the opening intermediate position a mutual contact between the bumper member 152 and the attachment member 150.

Also, and as shown in the Figures, relative movement between the draw member 106 and the main frame 104 from the opening intermediate position such as shown in FIGS. 9A, 10, and 11 to the fully retracted position such as shown in FIG. 9B pivots the first sequenced wing 142 towards the unfolded position by the mutual contact between the bumper member 152 and the attachment member 150.

It is to be appreciated that the first and second sequenced wings 142, 143 are respectively pivotable about axis L and O relative to the main frame 104 between their respective unfolded positions extending substantially perpendicular to the main frame 104 such as shown in FIGS. 1-3, 7A, and 9B and their respective folded positions extending substantially in parallel with the main frame 104 such as shown in FIGS. 7D, 8, and 9A. It is further to be appreciated that relative movement between the draw member 106 and the main frame 104 from the folding intermediate position fully to the extended position pivots the first and second sequenced wings 142, 143 fully to their respective folded positions extending substantially in parallel with the main frame 104, and that relative movement between the draw member 106 and the main frame 104 from the opening intermediate position fully to the retracted position pivots the first and second sequenced wings 142, 143 fully to their respective unfolded positions extending substantially perpendicular to the main frame 104.

As can be appreciated, relative movement between the draw member 106 and the main frame 104 from the retracted position to the folding intermediate position between the retracted position and the extended position causes no motion of either of the first or second sequenced wings 142, 143 by the slidable coupling between the draw member 106 and the main frame 104, and that relative movement between the draw member 106 and the main frame 104 from the extended position to the opening intermediate position causes no motion of either of the first or second sequenced wings 142, 143 by the slidable coupling between the draw member 106 and the main frame 104.

However, and since the first and second direct wings 144, 145 are coupled with the head member 107 by respective first and second direct draft links 162, 163, relative movement between the draw member 106 and the main frame 104 towards the retracted position pivots the first and second direct wings 144, 145 into their respective unfolded positions, and relative movement between the draw member 106 and the main frame 104 towards the extended position pivots the first and second direct wings 144, 145 towards their respected folded positions. As described herein, the first direct wing 144 is pivotably connected with the main frame 104 at a first position such that the first direct wing 144 is pivotable relative to the main frame between an unfolded position and a folded position, and further that the first direct draft link 162 has a first end 162*a* pivotably connected with the first direct wing 144 and a second end 162*b* pivotably connected with the draw member 106. Similarly, the second direct wing 145 is pivotably connected with the main frame 104 at a first position such that the second direct wing 145 is pivotable relative to the main frame between an unfolded position and a folded position, and further that the second direct draft link 163 has a first end 163*a* pivotably connected with the second direct wing 144 and a second end 163*b* pivotably connected with the draw member 106. In this way, the first and second direct wings 144, 145 are directly movable with the relative movement between the draw member 106 and the main frame 104.

It is to be appreciated that relative movement between the draw member 106 and the main frame 104 from the retracted position to a folding intermediate position between the retracted position and the extended position causes at the folding intermediate position a mutual contact between the trip member 154 and the attachment member 150, and relative movement between the draw member 106 and the main frame 104 from the extended position to an opening intermediate position between the retracted position and the extended position causes at a position between the opening intermediate position and the retracted position the trip member 154 and the attachment member 150 to mutually separate and causes at the opening intermediate position a mutual contact between the bumper member 152 and the attachment member 150.

It is further to be appreciated that the relative movement between the draw member 106 and the main frame 104 from the retracted position to the folding intermediate position causes the direct wings 144, 145 to pivot towards their respective folded positions without pivotable movement of the sequenced wings 142, 143.

It is further to be appreciated that relative movement between the draw member 106 and the main frame 104 from the extended position to the opening intermediate position causes the direct wings 144, 145 to pivot towards their respective unfolded positions without pivotable movement of the sequenced wings 142, 143.

It is further to be appreciated that relative movement between the draw member 106 and the main frame 104 from the extended position to the opening intermediate position causes the direct wings 144, 145 to pivot towards their respective unfolded positions without pivotable movement of the sequenced wings 142, 143.

It is further to be appreciated that relative movement between the draw member 106 and the main frame 104 from the retracted position to the folding intermediate position causes the direct wings 144, 145 to pivot towards their respective folded positions without pivotable movement of the sequenced wings 142, 143.

A method is described herein and shown for example in FIGS. 3, 7B, 9A, and 10 for operating an agricultural implement 100 including sequenced wings 142, 143 operatively connected with an attachment member of the agricultural implement 100 by sequenced draft links and being pivotably connected with a main frame 104 of the implement at positions such that the sequenced wings 142, 143 are pivotably movable relative to the main frame between respective folded and unfolded positions, and direct wings 144, 145 operatively connected with a draw member 106 of the agricultural implement 100 by direct draft links and being pivotably connected with the main frame 104 at positions such that the direct wings 144, 145 are pivotably movable relative to the main frame between respective folded and unfolded positions. The method comprises pivoting the direct wings 144, 145 towards their respective folded positions without pivotable movement of the sequenced wings 142, 143 by causing relative movement between the draw member 106 and the main frame 104 from a retracted position to a folding intermediate position between the retracted position and an extended position, and pivoting the direct wings 144, 145 pivot towards their respective unfolded positions without pivotable movement of the sequenced wings 142, 143 by causing relative movement between the draw member 106 and the main frame 104 of the implement from the extended position to an opening intermediate position between a retracted position and the extended position.

The method of operating the agricultural implement 100 further comprises pivoting both the direct wings 144, 145 and the sequenced wings 142, 143 towards their respective folded positions by causing relative movement between the draw member 106 and the main frame 104 from the folding intermediate position to the extended position.

The method of operating the agricultural implement 100 further comprises pivoting both the direct wings 144, 145 and the sequenced wings 142, 143 towards their respective unfolded positions by causing relative movement between the draw member 106 and the main frame 104 from the unfolding intermediate position to the retracted position.

It is to be understood that other embodiments will be utilized, and structural and functional changes will be made without departing from the scope of the claims. The foregoing descriptions of embodiments have been presented for the purposes of illustration and description. It is not intended to be exhaustive or to limit the embodiments to the precise forms disclosed. Accordingly, many modifications and variations are possible considering the above teachings. It is therefore intended that the scope of the claims is not limited by this detailed description.

The invention claimed is:

1. An agricultural implement comprising:

a main carrier comprising a main frame and a draw member slidably coupled with the main frame for movement relative to the main frame between an extended position and a retracted position, the draw member having opposite first and second ends, wherein the first end is adapted for selective connection with an associated agricultural tow vehicle;

a bumper member connected with the draw member adjacent the first end of the draw member;

a trip member connected with the draw member between the bumper member and the second end of the draw member;

an attachment member slidably connected with the draw member, the attachment member being slidably movable relative to the draw member for a portion of the draw member extending between the trip member and the bumper member;

a first sequenced wing carrying a first set of row units of a first rank of row units and being pivotably connected with the main frame such that the first sequenced wing is pivotably movable relative to the main frame between folded and unfolded positions; and a first sequenced draft link having a first end pivotably connected with the first sequenced wing and a second end pivotably connected with the attachment member such that:

relative movement between the draw member and the main frame from the retracted position to a folding intermediate position between the retracted position and the extended position causes at the folding intermediate position a mutual contact between the trip member and the attachment member;

relative movement between the draw member and the main frame from the folding intermediate position towards the extended position pivots the first sequenced wing towards the folded position by the mutual contact between the trip member and the attachment member;

relative movement between the draw member and the main frame from the extended position to an opening intermediate position causes the trip member and the attachment member to mutually separate and causes at the opening intermediate position a mutual contact between the bumper member and the attachment member; and relative movement between the draw member and the main frame from the opening intermediate position to the retracted position causes the first sequenced wing to pivot towards the unfolded position by the mutual contact between the bumper member and the attachment member.

2. The agricultural implement according to claim 1, wherein:

the first sequenced wing is pivotable relative to the main frame about an axis between:

the unfolded position extending substantially perpendicular to the main frame; and the folded position extending substantially in parallel with the main frame;

relative movement between the draw member and the main frame from the folding intermediate position fully to the extended position pivots the first sequenced wing fully to the folded position extending substantially in parallel with the main frame; and relative movement between the draw member and the main frame from the opening intermediate position fully to the retracted position pivots the first sequenced wing fully to the unfolded position extending substantially perpendicular to the main frame.

3. The agricultural implement according to claim 1, wherein:

relative movement between the draw member and the main frame from the retracted position to the folding intermediate position causes no motion of the first sequenced wing by the slidable coupling between the draw member and the main frame; and relative movement between the draw member and the main frame from the extended position to the opening intermediate position causes no motion of the first sequenced wing by the slidable coupling between the draw member and the main frame.

4. The agricultural implement according to claim 1, further comprising:

a second sequenced wing carrying a second set of row units of the first rank of row units and being pivotably connected with the main frame such that the second sequenced wing is pivotably movable relative to the main frame between an folded and unfolded positions; and a second sequenced draft link having a first end pivotably connected with the second sequenced wing and a second end pivotably connected with the attachment member such that:

relative movement between the draw member and the main frame from the folding intermediate position towards the extended position causes the second sequenced wing to pivot towards the folded position by the mutual contact between the trip member and the attachment member; and relative movement between the draw member and the main frame from the opening intermediate position to the retracted position causes the second sequenced wing to pivot towards the unfolded position by the mutual contact between the bumper member and the attachment member.

5. The agricultural implement according to claim 4, wherein:

the second sequenced wing is pivotable relative to the main frame about an axis between:

the unfolded position extending substantially perpendicular to the main frame; and the folded position extending substantially in parallel with the main frame;

relative movement between the draw member and the main frame from the folding intermediate position fully to the extended position causes the first and second sequenced wings to pivot fully to their respective folded positions extending substantially in parallel with the main frame; and relative movement between the draw member and the main frame from the opening intermediate position fully to the retracted position causes the first and second sequenced wings to pivot fully to their respective unfolded position extending substantially perpendicular to the main frame.

6. The agricultural implement according to claim 4, wherein:

relative movement between the draw member and the main frame from the retracted position to the folding intermediate position causes no motion of the first or second sequenced wings by the slidable coupling between the draw member and the main frame; and relative movement between the draw member and the main frame from the extended position to the opening intermediate position causes no motion of the first or second sequenced wings by the slidable coupling between the draw member and the main frame.

7. The agricultural implement according to claim 1, further comprising:

a first direct wing pivotably connected with the main frame such that the first direct wing is pivotably movable relative to the main frame between folded and unfolded positions;

a first direct draft link having a first end pivotably connected with the first direct wing and a second end pivotably connected with the draw member such that:

relative movement between the draw member and the main frame towards the retracted position causes the first direct wing to pivot towards the unfolded position; and relative movement between the draw member and the main frame towards the extended position causes the first direct wing to pivot towards the folded position.

8. The agricultural implement according to claim 7, wherein:

relative movement between the draw member and the main frame from the retracted position to the folding intermediate position causes:

no motion of the first sequenced wing by the slidable coupling between the draw member and the main frame; and motion of the first direct wing towards its folded position by the first direct wing being connected with the draw member by the first direct draft link; and relative movement between the draw member and the main frame from the extended position to the opening intermediate position causes:

no motion of the first sequenced wing by the slidable coupling between the draw member and the main frame; and motion of the first direct wing towards its unfolded position by the first direct wing being connected with the draw member by the first direct draft link.

9. The agricultural implement according to claim 7, further comprising:

a second sequenced wing carrying a second set of row units of the first rank of row units and being pivotably connected with the main frame such that the second sequenced wing is pivotably movable relative to the main frame between folded and unfolded positions;

a second sequenced draft link having a first end pivotably connected with the second sequenced wing and a second end pivotably connected with the attachment member such that:

relative movement between the draw member and the main frame from the folding intermediate position towards the extended position causes the second sequenced wing to pivot towards the folded position by the mutual contact between the trip member and the attachment member; and relative movement between the draw member and the main frame from the opening intermediate position to the retracted position causes the second sequenced wing to pivot towards the unfolded position by the mutual contact between the bumper member and the attachment member;

a second direct wing pivotably connected with the main frame such that the second direct wing is pivotably movable relative to the main frame between folded and unfolded positions;

a second direct draft link having a first end pivotably connected with the second direct wing and a second end pivotably connected with the draw member such that:

relative movement between the draw member and the main frame towards the retracted position causes the second direct wing to pivot towards the unfolded position; and relative movement between the draw member and the main frame towards the extended position causes the second direct wing to pivot towards the folded position.

10. An agricultural implement comprising:

a main carrier comprising a main frame and a draw member having opposite first and second ends and being slidably coupled with the main frame for movement relative to the main frame between extended and retracted positions;

a bumper member connected with the draw member adjacent the first end of the draw member;

a trip member connected with the draw member between the bumper member and the second end of the draw member;

an attachment member slidably connected with the draw member, the attachment member being slidably movable relative to the draw member for a portion of the draw member extending between the trip member and the bumper member;

sequenced wings operatively connected with the attachment member by sequenced draft links and being pivotably connected with the main frame at positions such that the sequenced wings are pivotably movable relative to the main frame between respective folded and unfolded positions; and direct wings operatively connected with the draw member by direct draft links and being pivotably connected with the main frame at positions such that the direct wings are pivotably movable relative to the main frame between respective folded and unfolded positions, wherein relative movement between the draw member and the main frame from the retracted position to a folding intermediate position between the retracted position and the extended position causes at the folding intermediate position a mutual contact between the trip member and the attachment member, wherein relative movement between the draw member and the main frame from the extended position to an opening intermediate position between the retracted position and the extended position causes at a position between the opening intermediate position and the retracted position the trip member and the attachment member to mutually separate and causes at the opening intermediate position a mutual contact between the bumper member and the attachment member.

11. The agricultural implement according to claim 10, wherein the relative movement between the draw member and the main frame from the retracted position to the folding intermediate position causes the direct wings to pivot towards their respective folded positions without pivotable movement of the sequenced wings.

12. The agricultural implement according to claim 11, wherein the relative movement between the draw member and the main frame from the extended position to the opening intermediate position causes the direct wings to pivot towards their respective unfolded positions without pivotable movement of the sequenced wings.

13. The agricultural implement according to claim 10, wherein the relative movement between the draw member and the main frame from the extended position to the opening intermediate position causes the direct wings to pivot towards their respective unfolded positions without pivotable movement of the sequenced wings.

14. The agricultural implement according to claim 13, wherein the relative movement between the draw member and the main frame from the retracted position to the folding intermediate position causes the direct wings to pivot towards their respective folded positions without pivotable movement of the sequenced wings.

15. A method of operating an agricultural implement including sequenced wings operatively connected with an attachment member of the agricultural implement by sequenced draft links and being pivotably connected with a main frame of the implement at positions such that the sequenced wings are pivotably movable relative to the main frame between respective folded and unfolded positions, and direct wings operatively connected with a draw member of the agricultural implement by direct draft links and being pivotably connected with the main frame at positions such that the direct wings are pivotably movable relative to the main frame between respective folded and unfolded positions, the method comprising:

pivoting the direct wings towards their respective folded positions without pivotable movement of the sequenced wings by causing relative movement between the draw member and the main frame from a retracted position to a folding intermediate position between the retracted position and an extended position; and pivoting the direct wings pivot towards their respective unfolded positions without pivotable movement of the sequenced wings by causing relative movement between the draw member and the main frame of the implement from the extended position to an opening intermediate position between a retracted position and the extended position.

16. The method according to claim 15, further comprising:

pivoting both the direct wings and the sequenced wings towards their respective folded positions by causing relative movement between the draw member and the main frame from the folding intermediate position to the extended position.

17. The method according to claim 16, further comprising:

pivoting both the direct wings and the sequenced wings towards their respective unfolded positions by causing relative movement between the draw member and the main frame from the unfolding intermediate position to the retracted position.

18. The method according to claim 15, further comprising:

pivoting both the direct wings and the sequenced wings towards their respective unfolded positions by causing relative movement between the draw member and the main frame from the unfolding intermediate position to the retracted position.

19. The method according to claim 18, further comprising:

pivoting both the direct wings and the sequenced wings towards their respective folded positions by causing relative movement between the draw member and the main frame from the folding intermediate position to the extended position.

* * * * *